(12) United States Patent
Falgner et al.

(10) Patent No.: US 12,350,958 B2
(45) Date of Patent: Jul. 8, 2025

(54) TRANSFER FILM, PLASTIC INJECTION-MOLDED ARTICLE, AND METHOD FOR THE PRODUCTION THEREOF

(71) Applicant: LEONHARD KURZ Stiftung & Co. KG, Fürth (DE)

(72) Inventors: Steffen Falgner, Prittriching (DE); Christoph Suss, Rednitzhembach (DE); Sven Oberndörfer, Fürth (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 157 days.

(21) Appl. No.: 18/019,124

(22) PCT Filed: Jul. 15, 2021

(86) PCT No.: PCT/EP2021/069680
§ 371 (c)(1),
(2) Date: Feb. 1, 2023

(87) PCT Pub. No.: WO2022/028838
PCT Pub. Date: Feb. 10, 2022

(65) Prior Publication Data
US 2023/0302845 A1    Sep. 28, 2023

(30) Foreign Application Priority Data
Aug. 6, 2020   (DE) .................. 10 2020 120 754.9

(51) Int. Cl.
*B44C 1/17*      (2006.01)
*B29C 45/14*    (2006.01)
(Continued)

(52) U.S. Cl.
CPC ...... *B44C 1/1712* (2013.01); *B29C 45/14688* (2013.01); *B32B 27/06* (2013.01);
(Continued)

(58) Field of Classification Search
CPC .... B29C 45/14688; B29C 2045/14737; B29K 2995/0025; B29K 2995/0026; B32B 2451/00; B32B 2307/41; B32B 2307/412
See application file for complete search history.

(56) References Cited

U.S. PATENT DOCUMENTS 10,377,169 B2    8/2019   Yoon et al.
2008/0032070 A1  2/2008   Hirschfelder et al.
(Continued)

FOREIGN PATENT DOCUMENTS

DE    10 2004 041 868 B3    3/2006
DE    10 2009 031 478 A1    1/2011
(Continued)

OTHER PUBLICATIONS

Machine translation of JP 2006-305898 via EPO (Year: 2006).*
(Continued)

*Primary Examiner* — Galen H Hauth
(74) *Attorney, Agent, or Firm* — Hoffmann & Baron, LLP

(57) ABSTRACT

Methods for producing a transfer film (1), in particular IMD transfer film (1), wherein the following steps are carried out, in particular in the specified order:
  preparing a carrier ply (3),
  preparing a transfer ply (2) having a decorative ply (21), wherein the transfer ply (2) has been or is arranged on the carrier ply (3),
  applying one or more forming elements (40) to the carrier ply (3), wherein the one or more forming elements (40) have a three-dimensional shape and are applied register-accurately with respect to the decorative ply (21).
A method for coating a plastic injection-molded article with the transfer film, as well as the transfer film and the plastic injection-molded article.

9 Claims, 9 Drawing Sheets

(51) Int. Cl.
    *B32B 27/06*          (2006.01)
    *B32B 27/40*          (2006.01)
    *B44C 3/02*           (2006.01)
    *B44C 5/04*           (2006.01)

(52) U.S. Cl.
    CPC .............. *B32B 27/40* (2013.01); *B44C 3/025* (2013.01); *B44C 5/0453* (2013.01); *B29C 2045/14737* (2013.01); *B29K 2995/0025* (2013.01); *B29K 2995/0026* (2013.01); *B32B 2307/41* (2013.01); *B32B 2307/412* (2013.01); *B32B 2451/00* (2013.01)

(56) References Cited

U.S. PATENT DOCUMENTS

| | | | |
|---|---|---|---|
| 2012/0156445 A1* | 6/2012 | Schmidt | B32B 27/308 |
| | | | 156/247 |
| 2015/0273757 A1 | 10/2015 | Pforte et al. | |
| 2017/0144344 A1 | 5/2017 | Schmidt et al. | |
| 2017/0326860 A1 | 11/2017 | Benyahia et al. | |
| 2019/0240884 A1 | 8/2019 | Nakagawa et al. | |
| 2019/0381821 A1 | 12/2019 | Schmidt et al. | |
| 2021/0379814 A1 | 12/2021 | Heinrich et al. | |

FOREIGN PATENT DOCUMENTS

| | | |
|---|---|---|
| DE | 10 2014 104 321 A1 | 10/2015 |
| DE | 10 2016 101 970 A1 | 8/2017 |
| DE | 10 2017 101 595 B3 | 5/2018 |
| DE | 10 2018 124 853 A1 | 4/2020 |
| JP | P4053688 B2 | 8/1992 |
| JP | 2 908 467 B2 | 6/1999 |
| JP | 2006-305898 A | 11/2006 |
| WO | 2016/096184 A1 | 6/2016 |
| WO | 2018/138082 A1 | 8/2018 |

OTHER PUBLICATIONS

International Search Report, PCT/EP2021/069680 dated Jan. 24, 2022.
German Examination Report, Application 10 2020 120 754.9 dated May 18, 2021.

* cited by examiner

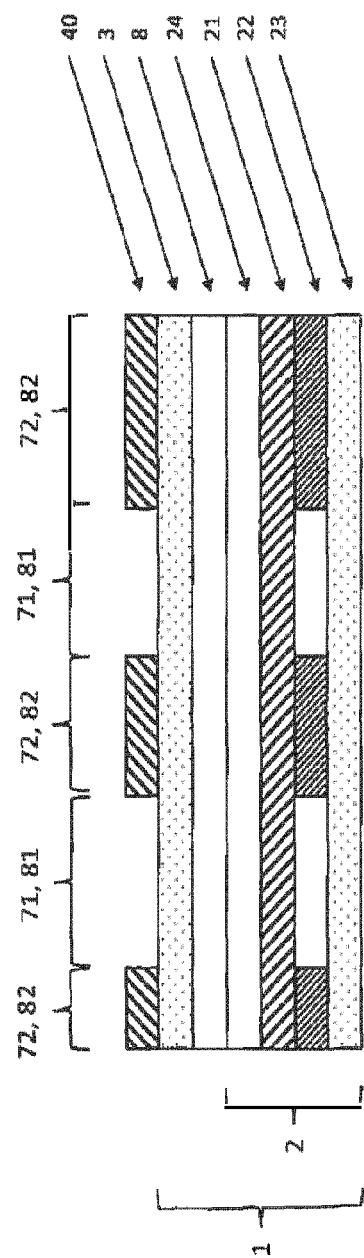

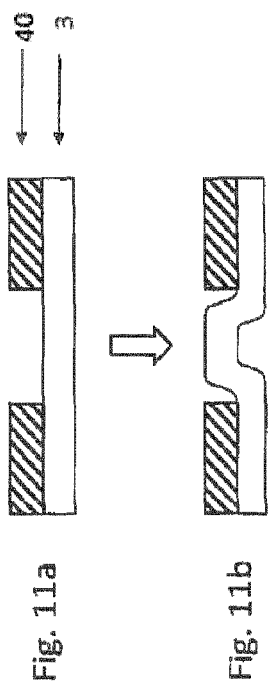
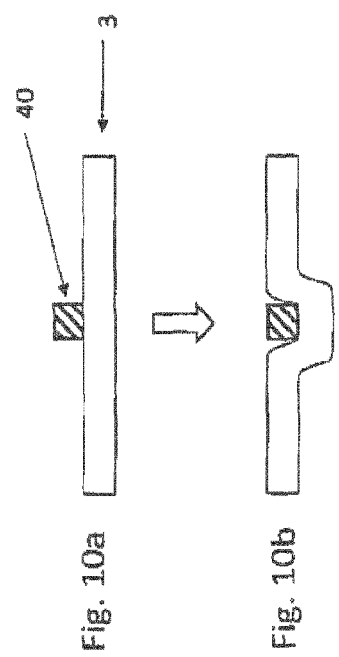

TRANSFER FILM, PLASTIC INJECTION-MOLDED ARTICLE, AND METHOD FOR THE PRODUCTION THEREOF This application is a National Stage application based on an International Application filed under the Patent Cooperation Treaty, PCT/EP2020/069680, filed Jul. 15, 2021, which claims priority to DE 102020120754.9, filed Aug. 6, 2020.

BACKGROUND OF THE INVENTION

The invention relates to a transfer film, a plastic injection-molded article, and a method for the production thereof.

It is known to place decorative films in injection molds in IMD methods and to back-injection mold them with a plastic compound. During the back-injection molding, the decorative film adopts a shape complementary to the injection mold. After the back-injection molding, the carrier ply is peeled off the decorative film. It is further known here to introduce surface structures into the surface exposed in this way. However, a change of the shape to be produced requires a change of the injection mold and the surface structures are not arranged register-accurately with respect to the decoration of the decorative film.

SUMMARY OF THE INVENTION

The object of the present invention is thus to specify a transfer film and a plastic injection-molded article coated with a transfer film with improved properties, in particular improved decorative and/or functional properties, as well as improved methods for the production thereof.

The object is achieved by means of a method for producing a transfer film, in particular IMD transfer film (IMD=In-Mold Decoration). In the method, the following steps are carried out, in particular in the specified order:
  a) preparing a carrier ply,
  b) preparing a transfer ply comprising a decorative ply, wherein the transfer ply has been or is arranged on the carrier ply,
  c) applying one or more forming elements to the carrier ply, wherein the one or more forming elements have a three-dimensional shape and are applied register-accurately with respect to the decorative ply.

The object is further achieved by means of a transfer film, in particular IMD transfer film. The transfer film is preferably produced by means of the method according to the invention. The transfer film has a carrier ply and a transfer ply comprising a decorative ply, wherein the transfer ply is arranged on the carrier ply. The transfer film further comprises one or more forming elements, wherein the one or more forming elements are applied to the carrier ply and register-accurately with respect to the decorative ply.

The object is further achieved by means of a method for producing a plastic injection-molded article which is coated with a transfer film, in particular IMD transfer film. Here, the transfer film is preferably produced according to the method according to the invention for producing a transfer film and/or a transfer film according to the invention. The method for producing the plastic injection-molded article comprises the following steps, in particular in the specified order:
  x1) preparing a transfer film, wherein the transfer film has a carrier ply, and has a transfer ply comprising a decorative ply, wherein the transfer ply has been or is arranged on the carrier ply,
  x2) preparing one or more forming elements on the carrier ply, wherein the one or more forming elements have a three-dimensional shape and have been or are applied register-accurately with respect to the decorative ply,
  x3) back-injection molding the transfer film with an injection-molding compound, wherein, through the action of the injection-molding compound on the transfer film, a molding of the three-dimensional shape of the one or more forming elements is introduced into the transfer ply register-accurately with respect to the decorative ply.

The method for producing the plastic injection-molded article is thus in particular an IMD injection molding method.

The object is further achieved by a plastic injection-molded article. The plastic injection-molded article is in particular produced using the method according to the invention for producing the plastic injection-molded article. The plastic injection-molded article comprises an injection-molding compound and a transfer ply of a transfer film, in particular IMD transfer film, back-injection molded with the injection-molding compound. The transfer film is in particular produced using the method according to the invention for producing a transfer film and/or a transfer film according to the invention. The transfer ply comprises a decorative ply and has a molding of a three-dimensional shape, wherein the molding is introduced register-accurately with respect to the decorative ply.

The molding of the three-dimensional shape is thus in particular not merely the shape of a mold half of an injection molding machine. The molding is preferably a molding which is additionally introduced in the shape of the transfer ply which is produced by a mold half against which the carrier ply and/or the one or more forming elements rest during the back-injection molding of the transfer film with the injection-molding compound.

It is hereby achieved in particular that haptic and/or tactile elements and/or depth effects can be produced on the surface of the plastic injection-molded article. It is further achieved that the haptic and/or tactile elements and/or the depth effects can be produced register-accurately with respect both to decorative elements and/or to backlighting masks and/or to functional component parts, such as e.g. backlights and/or touch sensors of the plastic injection-molded article. It is possible here that the transillumination properties of the plastic injection-molded article are not impaired. It is in particular made possible to prepare haptic and/or tactile elements and/or depth effects on a plastic injection-molded article which, due to their register-accurate arrangement with respect to the decorative ply and optionally to a mask layer and/or to functional component parts, guarantee an improved operation and/or perception during use of the plastic injection-molded article.

It is further made possible that the need to produce new molds for different surface structures can be reduced and/or shapes prepared by means of a mold can be supplemented by a further three-dimensional shape and in particular individualized. In addition, it is achieved that transfer films and thus coated plastic injection-molded articles can be manufactured cost-effectively in small batch sizes. If shapes prepared by means of a mold are supplemented by means of the three-dimensional shape, the advantage can thus also be achieved that the positioning of the transfer film in the injection molding machine can be configured more efficiently. Depending on the application, for example, a deviation of the relative position between the decorative ply and the mold of the injection molding machine from a target position can be disregarded at least to a certain extent. Since the molding of the three-dimensional shape is always arranged register-accurately with respect to the decorative ply due to the register-accurate application of the one or more forming elements with respect to the decorative ply, a precise impression of the arrangement of the different components of the plastic injection-molded article is retained. Here, all functional component parts can further be arranged register-accurately with respect to the molding of the three-dimensional shape and at the same time with respect to the decorative ply and optionally a mask layer, with the result that the functional component parts can function and be operated precisely.

Advantageous designs of the invention are described in the dependent claims.

By registered or register or registration-accurately or register-accurately or registration accuracy or register accuracy is meant a positional accuracy of two or more layers relative to one another. The register accuracy is to range within a predefined tolerance, the register tolerance, which is to be as small as possible. At the same time, the register accuracy of several elements and/or layers relative to one another is an important feature in order to increase the process reliability. The positionally accurate positioning can in particular be effected by means of sensorily, preferably optically, detectable registration marks or register marks. These registration marks or register marks can either represent specific separate elements or areas or layers or themselves be part of the elements or areas or layers to be positioned.

By a layer and/or a ply is meant in particular a substantially two-dimensional structure which is preferably formed over the whole surface or patterned and itself is preferably single-layered or multi-layered.

By a haptic element is meant in particular an element which is haptically perceptible. By a tactile element is meant in particular an element which is tactilely perceptible.

A functional component part is in particular a component part with an electrical, in particular electronic, function. By a functional component part is preferably meant a component part which makes an interaction with a user possible, preferably through information input and/or information output.

It is possible that during step b) the preparing comprises an application of the transfer ply comprising at least the decorative ply to the carrier ply. The one or more forming elements are preferably applied partially to the carrier ply and/or applied in partial areas with a greater thickness than in other partial areas. An application of layers to the carrier ply can in particular take place directly to the carrier ply or indirectly via one or more further layers.

Areas, and in particular also partial areas, are preferably specified in the case of a viewing perpendicularly onto a plane and/or main surface spanned by the transfer film or a respective layer, and preferably comprise all parts of the transfer film and/or of the plastic injection-molded article overlapping this plane and/or main surface.

It is possible that the transfer ply has been or is applied to a first side of the carrier ply and the one or more forming elements have been or are applied to a second side of the carrier ply lying opposite the first side.

In an advantageous embodiment of the plastic injection-molded article and/or of the method for the production thereof, the molding has been and/or is in particular arranged in such a way that the molding does not impair the transillumination properties of the transfer ply, in particular the decorative ply and/or the mask layer, and/or the injection-molding compound. By not impaired is meant in particular that the molding is arranged in such a way that the molding has substantially no influence on the wavelength, in particular the color, and/or the scattering and/or the lightness and/or the luminance of a radiation being transmitted through a viewing area of the transfer ply, in particular of the light being transmitted through the viewing area of the transfer ply. For example, the transfer ply, in particular the protective layer of the transfer ply, can be transilluminated uniformly in the viewing area, in particular when the transfer ply already has the molding.

Expediently, the molding does not overlap the viewing area or, if the molding does overlap the viewing area, it is guaranteed that the transfer ply, in particular the protective layer of the transfer ply, has substantially no layer thickness changes in the viewing area. This can be achieved for example when the viewing area is overlapped over the whole surface by the molding.

It is further possible that the one or more forming elements have a constant layer thickness at least in the viewing area for this purpose.

In other words, this means that the transillumination properties are not, or not significantly, impaired. By transillumination properties is meant, for example, in particular the light scattering and/or the luminous intensity and/or the light color and/or the wavelength and/or the luminance and/or the radiation angle.

The back-injection molding of the transfer film with the injection-molding compound preferably takes place at a temperature of the injection-molding compound in a range of from 200° C. to 300° C. The injection-molding compound preferably comprises or in particular consists of ABS, ASA, PA, PP, PC, PMMA, SAN, TPO or a mixture of two or more of the named materials.

Before the back-injection molding of the transfer film, the transfer film is preferably arranged in an injection molding machine on a mold half, in particular arranged between two mold halves, wherein the mold halves are closed before the back-injection molding. Through the back-injection molding of the transfer film with the injection-molding compound, the transfer film is in particular pressed against a mold half and forms a shape complementary to the mold half. The molding of the plastic injection-molded article has been or is in particular formed by means of the one or more forming elements. It is possible that the one or more forming elements and/or the carrier ply are then removed from the plastic injection-molded article or are removed in the in particular finished plastic injection-molded article.

By a three-dimensional shape of the forming elements and/or of the molding is meant in particular that the dimensions in all three spatial directions substantially contribute to the design of the one or more forming elements or the molding. Through the three-dimensional shape, in particular at least one surface of the transfer ply has been or is thus curved, in particular in addition to a curvature brought about by a mold half of the injection molding machine.

The one or more forming elements preferably form one or more motifs or comprise them and/or are introduced into the transfer film in particular for the formation of one or more motifs, in particular the molding in the plastic injection-molded article. It is in particular possible that the outer contours of a projection of the one or more forming elements and/or the molding into a plane follow the outer contours of an in particular two-dimensional motif. It is also possible that the three-dimensional shape comprises a two-dimensional motif and the two-dimensional motif is preferably provided with a three-dimensional structure, for example because the two-dimensional motif is provided with a height in a third spatial direction. The height of the two-dimensional motif is, for example, the thickness or height of a forming element and/or the height of the molding. It is further possible that a three-dimensional shape is a motif which can only be depicted by a three-dimensional structure. A motif is for example selected from or is a combination of figural representation, image, symbol, logo, coat of arms, portrait, pattern, alphanumeric character, in particular 3D lettering, wherein it can preferably be positive and/or negative images. Thus, the motifs can be provided for depth effects and/or haptic and/or tactile elements.

In particular, during the back-injection molding of the transfer film with the injection-molding compound of step x3), a recessed area is produced in the transfer ply, wherein the recessed area is preferably formed by the molding and in particular contains a positive image of the one or more forming elements. It is also possible that, during the back-injection molding of the transfer film with the injection-molding compound of step x3), a raised area, which in particular contains a negative image of the one or more forming elements, is formed in the transfer ply. It is thus possible that the raised area and/or the recessed area and/or the molding forms one or more motifs, which are in particular complementary to the one or more motifs of the one or more forming elements. A raised area is in particular an area in which there is no forming element present in the transfer film and/or in which the transfer ply deforms in the direction of the carrier ply during the back-injection molding with the injection-molding compound. A recessed area is in particular an area in which a forming element is present in the transfer film and/or in which the transfer ply does not move, or substantially does not move, in the direction of the carrier ply during the back-injection molding with the injection-molding compound. The raised and/or the recessed area can be a continuous area or alternatively or additionally comprise one or more partial areas separate from one another. The transfer ply has been or is preferably arranged at least on a boundary line between an with the one or more forming elements and an area without forming elements, preferably when viewed perpendicularly onto a plane spanned by the transfer film. It is hereby possible that, for example through an action of pressure and/or heat on the transfer film, the transfer ply is deformed register-accurately with respect to the decorative ply, in particular by producing the raised area and the recessed area.

It is possible that one or more first layers of the one or more forming elements contain or consist of a digital printing ink, preferably contain or consist of an inkjet printing ink, preferably a UV inkjet printing ink. In particular in the method for producing the transfer film in step c), one or more first layers of the one or more forming elements are applied using a digital printing method, preferably an inkjet printing method, preferably a UV inkjet printing method.

It is further possible that one or more layers of the one or more forming elements are crosslinkable or crosslinked, in particular by means of radiation, preferably UV radiation.

By means of a digital printing method it is in particular achieved that a small batch size, in particular a batch size of one, can be realized. Further, by means of digital printing methods, in particular UV inkjet printing methods, the register tolerance is improved.

In the digital printing method, one or more layers are preferably printed by means of one or more printing inks selected from CMYK inks (CMYK=Cyan, Magenta, Yellow, Black) or spot colors, for example white or metallic inks.

It is furthermore also conceivable that, in particular in step c), one or more layers of the one or more forming elements have been or are applied by means of gravure printing and/or flexographic printing and/or screen printing. It is thus also possible that one or more layers of the one or more forming elements of the transfer film comprise a gravure printing ink and/or a flexographic printing ink and/or a screen printing ink.

It is in particular possible that the one or more forming elements are single-layered or multi-layered. Preferably, two or more layers of the one or more forming elements are, in step c), and/or have been, in the transfer film, applied overlapping one another and/or the one or more forming elements are applied at least partially by means of 3D printing. It is hereby made possible for example to increase the height of the one or more forming elements starting from the carrier ply. It is further possible that several layers of the one or more forming elements are or have been applied by means of the same printing method and/or several layers are or have been applied by means of different printing methods. By 3D printing can be meant, for example, Selective Laser Sintering (SLS), Fused Deposition Modeling (FDM) and/or stereolithography (SLA).

It is in particular possible that at least two different printing methods are used for the application of the one or more forming elements. It is for example possible to apply one or more first layers of the one or more forming elements by means of a printing method which is preferably not a digital printing method, for example by means of screen printing. A large, non-individualized surface area of the one or more forming elements is in particular applied using it. It is further possible that at least one layer of the one or more forming elements applied last in step c) is applied using a digital printing method, preferably an inkjet printing method, preferably a UV inkjet printing method. In particular, at least one layer of the one or more forming elements, which forms an outer surface of the transfer film, contains or consists of a digital printing ink, preferably an inkjet printing ink, preferably a UV inkjet printing ink. A spatial separation of applications of different layers can herewith be achieved for example in step c). An individualization, preferably in the form of small surface areas, is hereby made possible for example, in particular before and/or after transport, storage and in particular shortly before and/or at the location of the production of the plastic injection-molded article.

It is further possible that a molding with various heights is or has been produced in the plastic injection-molded article by means of various heights of the one or more forming elements. This is achieved in particular through the use of suitable settings in the digital printing method, preferably through the number of overlapping printing inks and/or layers of a forming element, the individual ink drop sizes, the UV curing parameters, the application weight of the individual printing inks and/or a combination thereof. It is thus possible that the transfer film contains one or more forming elements of various heights and/or that the plastic injection-molded article contains a molding with various heights and/or depths, in particular contains partial areas of the raised area with various heights and/or partial areas of the recessed area with various heights.

The layer thickness of a layer of the one or more forming elements applied by means of digital printing preferably lies in a range of from 0.5 µm to 50 µm, in particular in a range of from 1 µm to 25 µm.

It is further possible that at least one forming element of the one or more forming elements printed by means of digital printing has a layer thickness of from 1 µm to 200 µm. The layer thickness of at least one forming element of the one or more forming elements in particular lies in a range of from 1 µm to 200 µm. Here, several, preferably all, layers of the at least one forming element are preferably applied by means of digital printing and in particular overlapping.

It is further possible that a layer of the one or more forming elements printed by means of gravure printing has a layer thickness in a range of from 1 µm to 25 µm and/or that a layer of the one or more forming elements printed by means of screen printing has a layer thickness in a range of from 1 µm to 100 µm.

The height of the molding of the plastic injection-molded article which is achieved in particular in the method for producing the plastic injection-molded article preferably lies in a range of from 1 µm to 200 µm.

It is further possible that the method contains the following step:
  irradiating the one or more forming elements, in particular by means of UV irradiation, wherein one or more irradiation steps are carried out, which are preferably carried out after step c) and/or during step c), in particular before to at least one layer of the one or more forming elements is applied, overlapping, to at least one other layer of the two or more layers of the one or more forming elements.

The irradiation during step c), in particular before to at least one layer of the one or more forming elements is applied, overlapping, to at least one other layer of the two or more layers of the one or more forming elements, is advantageous because the viscosity of the respectively lower layer is thereby increased, with the result that for one thing this layer does not run and for another subsequent layers obtain a more stable substrate. It is conceivable that overlapping layers are cured in between so that they do not run, for example, and e.g. a higher height-to-width ratio can thereby be achieved.

The one or more forming elements have been or are preferably formed from the class of the polyacrylates and/or polymethacrylates, polyurethanes, in particular from the group of the polyester polyols, polyether polyols, polycarbonate polyols, polyacrylate polyols and/or combinations of these polymers, polyesters, polyethers, polyolefins, epoxy resins and/or from derivatives of those named. These formulations can in particular be both uncrosslinked and further crosslinked, preferably by isocyanates, carbodiimides, melamines and/or aziridines and/or derivatives of the named compounds.

The one or more forming elements can further and in particular be built up from radiation-curing acrylates and/or methacrylates, consisting of polyacrylic acrylates, polyurethane acrylates, polyester acrylates, polycarbonate acrylates and/or polyether acrylates and/or copolymers of those named. The radiation-curing formulations, in particular the radiation-curing acrylates and/or methacrylates, are preferably oligomers here. An oligomer is in particular a molecule with a number of monomers in a range of from 2 to 100.

The one or more forming elements preferably contain, in particular in addition to the named polyacrylates, further UV-curable acrylate monomers and/or methacrylate monomers, and/or are produced therefrom. Depending on the embodiment, these monomers in particular contain one or more acrylate groups and/or preferably further side groups such as e.g. alkyl, aryl, cycloalkyl, cycloalkylaryl, alkoxyalkyl, alkoxyaryl, thionyl, thionylaryl, cyclothionyl, cyclothionylaryl, alkoxythionyl, cycloalkoxythionyl, alkoxycyclothionyl, cycloalkoxycyclothionyl, alkoxythionylaryl, cycloalkoxythionylaryl, alkoxycyclothionylaryl and/or cycloalkoxycyclothionylaryl groups. Special varnish properties, such as e.g. the viscosity and an optimized formation of the three-dimensional network during the radiation curing, can hereby in particular be set. Through the selection of the monomers or combinations of them in particular further properties, such as e.g. the surface hardness or residual tack (usually referred to with the term "tackiness"), of the one or more forming elements can be controlled in a targeted manner.

The one or more forming elements can, in particular within the meaning of a combination of the above-named, consist of a radiation-curing dual cure varnish. Dual cure varnishes can consist of different polymers or oligomers, which have unsaturated acrylate groups and/or methacrylate groups. These functional groups can in turn be radically crosslinked with one another in the radiation-curing step. For the thermal pre-crosslinking in the first step, at least two or more alcohol groups are preferably also used in the case of these polymers or oligomers. These alcohol groups can in particular be crosslinked with multifunctional isocyanates or melamine formaldehyde resins. Various UV raw materials such as epoxy acrylates, polyether acrylates, polyester acrylates and in particular polyacrylic acrylates come into consideration for example as preferably unsaturated oligomers or polymers. In particular blocked and/or unblocked representatives based on TDI (TDI=toluene-2,4-diisocyanate), HDI (HDI=hexamethylene diisocyanate) or IPDI (IPDI=isophorone diisocyanate) are used as isocyanate. The melamine crosslinkers can come from the group of the fully etherified, the imino types and/or the benzoguanamines.

In a preferred embodiment, the one or more forming elements have been or are built up as a color layer, e.g. for better legibility in the later positioning and in particular for the register-accurate application of later-applied components. Here, the color layer can consist of or comprise colorants and/or pigments, in particular also optically variable pigments and/or metallic pigments. The one or more forming elements can in particular, for the optimization of rheological properties, also have been or be equipped with fillers such as for example HDK (fine-particle silica).

The one or more forming elements have been or are provided with release agents, in particular for improving the properties of detachment from an injection mold, in particular from the mold half which is in contact with the one or more forming elements in step x3). The release agents are preferably silicones. In particular for better integration in the three-dimensional network of the one or more forming elements, these silicones can for their part be equipped with side chains, which bear radiation-curable groups. These groups have been or are preferably formed from the classes of radiation-curing acrylates and/or methacrylates, consisting of and/or comprising acrylic acrylates, urethane acrylates, ester acrylates, carbonate acrylates and/or ether acrylates and/or copolymers of those named. Each of these groups, as well as the silicone itself, can in turn in particular bear terminal groups, which preferably contribute to the thermal crosslinking in the one or more forming elements. These terminal groups can in particular be alcohol groups, multifunctional isocyanates or melamine formaldehyde resins. Both blocked and unblocked representatives based on TDI (TDI=toluene-2,4-diisocyanate), HDI (HDI=hexamethylene diisocyanate) or IPDI (IPDI=isophorone diisocyanate) are preferably used as isocyanate. The melamine crosslinkers are in particular selected from the group of the fully etherified, the imino types and/or the benzoguanamines. The silicones can furthermore bear side groups, which in particular do not contribute to the crosslinking but nevertheless influence the properties of the relevant silicone in a targeted manner. These side groups can be selected e.g. from one or more of the substance classes of the alkyl, aryl, cycloalkyl, cycloalkylaryl, alkoxyalkyl, alkoxyaryl, thionyl, thionylaryl, cyclothionyl, cyclothionylaryl, alkoxythionyl, cycloalkoxythionyl, alkoxycyclothionyl, cycloalkoxycyclothionyl, alkoxythionylaryl, cycloalkoxythionylaryl, alkoxycyclothionylaryl or cycloalkoxycyclothionylaryl groups.

The one or more forming elements preferably contain so-called UV initiators, in particular for the initiation of the radiation curing, if this is in particular a UV-radiation curing. The UV initiators are preferably selected from the class of the α-alkoxy, α-hydroxy or α-amino-aryl ketones and/or the class of the acyl phosphine oxides. Acyl phosphine oxides are preferably used in combination with UV inkjet printing of the one or more forming elements in particular because of their particularly suitable absorption properties in the UV-LED range.

In particular for the improvement of special and typical varnish properties, such as e.g. the wetting, the running, the foam formation etc., it is possible that the one or more forming elements contain additives. For integrating these additives in the three-dimensional network, they are typically provided for their part with radiation-curing or thermally crosslinkable groups or combinations thereof.

In particular for the minimization of chain terminations during the radiation curing through reactions of the formed radicals with oxygen molecules from the air and/or for the reduction of the migration of radical chains on the forming element surface, tertiary amines and/or acrylate amines, in particular so-called amine synergists, are preferably added to the one or more forming elements. In particular for integrating these additives in the three-dimensional network, they are preferably likewise provided for their part with radiation-curing or thermally crosslinkable groups or combinations thereof.

It is possible that the raised area and/or the recessed area has a minimum line width and/or a minimum dot size in a range of from 0.025 mm to 0.1 mm. By the minimum line width is meant in particular the minimum width of an area. The minimum dot size is in particular the minimum diameter of an area with a circular footprint.

It is further possible that the recessed area has a minimum line width and/or minimum dot size of more than 0.025 mm, preferably for the production of a positive image of the one or more forming elements, in particular for the case where the one or more forming elements have been or are applied by means of digital printing.

It is further possible that the raised area has a minimum line width and/or minimum dot size of more than 0.040 mm, preferably for the production of a negative image of the one or more forming elements, in particular for the case where the one or more forming elements have been or are applied by means of digital printing.

It is further possible that the recessed area has a minimum line width and/or minimum dot size of more than 0.075 mm, preferably for the production of a negative image of the one or more forming elements, in particular for the case where the one or more forming elements have been or are applied by means of gravure printing.

It is further possible that the raised area has a minimum line width and/or minimum dot size of more than 0.12 mm, preferably for the production of a negative image of the one or more forming elements, in particular for the case where the one or more forming elements have been or are applied by means of gravure printing.

It is further possible that the recessed area has a minimum line width and/or minimum dot size of more than 0.10 mm, preferably for the production of a negative image of the one or more forming elements, in particular for the case where the one or more forming elements have been or are applied by means of screen printing.

It is further possible that the raised area has a minimum line width and/or minimum dot size of more than 0.15 mm, preferably for the production of a negative image of the one or more forming elements, in particular for the case where the one or more forming elements have been or are applied by means of screen printing.

No tangible difference, and/or no difference that can be felt by the fingertips, between positive and negative forming element can thus be ascertained, for example, in the case of a produced haptic surface area of approximately 0.5 cm×0.01 cm. By a positive forming element is meant an isolated forming element which produces a recessed area in the carrier ply after the back-injection molding, when the cross section is viewed. By a negative forming element is meant one or more whole-surface forming elements which produce a raised area of the carrier ply after the back-injection molding, when the cross section is viewed.

In particular, the one or more forming elements have a higher dimensional stability than the carrier ply and/or the transfer ply, preferably than at least one layer of the transfer ply. By a higher dimensional stability is meant in particular a higher resistance to deformation during the back-injection molding of the transfer film with the injection-molding compound.

The one or more forming elements are preferably mechanically stable and/or have a mechanical stability, in particular in the case of a back-injection molding with an injection-molding compound, preferably in an IMD injection-molding process, preferably in step x3). By the mechanical stability is meant here in particular the stability of the one or more forming elements with respect to the load acting through the injection-molding compound, in particular during the back-injection molding of the transfer film with the injection-molding compound. In other words, the one or more forming elements are preferably sufficiently hard and produce a sufficiently strong connection to the carrier film, in order to withstand in particular the high pressure which is generated during the back-injection molding. For this purpose, the one or more forming elements preferably have a glass transition temperature of more than 200° C. It is further possible that the one or more forming elements have a substantially constant compressive strength up to a temperature of 200° C. In particular the deformation of the transfer ply when the transfer film is exposed to pressure and/or heat, in particular during the back-injection molding of the transfer film with the injection-molding compound, is hereby guaranteed. Further, a high edge sharpness of the molding is in particular made possible.

It is possible that the mechanical stability is determined with reference to the difference in height when comparing the height of the one or more forming elements before and after the back-injection molding of the transfer film with the injection-molding compound, wherein the height of the one or more forming elements after the back-injection molding of the transfer film with the injection-molding compound corresponds to the height of the molding of the plastic injection-molded article.

The molding preferably has a height in a range of from 90% to 100% of the height of the one or more forming elements of the transfer film before the back-injection molding with the injection-molding compound. It is possible that the temperatures arising in the injection mold during the back-injection molding, in particular the temperature of the injection-molding compound, lie or lies in a range of from 150° C. to 500° C., in particular in a range of from 200° C. to 300° C. It is possible that the pressures arising in the injection mold during the back-injection molding, in particular the internal pressure of the injection mold, lie or lies in a range of from 300 bar to 1000 bar, in particular in a range of from 400 bar to 800 bar.

The height of the molding is preferably determined on the plastic injection-molded article in particular with reference to the difference in height between an outer surface of the transfer ply in the recessed area and a neighboring outer surface of the transfer ply in a raised area. An outer surface is in particular an exposed surface, preferably after a detachment of the carrier ply. The height of the one or more forming elements is in particular measured before the back-injection molding of the transfer film. The measurement of the height of the molding and/or of the one or more forming elements and/or the line width and/or the dot size is in particular carried out by means of scanning electron microscope (SEM).

It is possible for example that, after the back-injection molding of the injection-molding compound, the molding has a height of 90% of the height of the one or more forming elements before the back-injection molding of the transfer film with the injection-molding compound, in particular for the case where the carrier ply has a layer thickness of 50 µm and preferably consists of PET. It is also possible that, after the back-injection molding of the injection-molding compound, the molding has a height of 100% of the height of the one or more forming elements before the back-injection molding of the transfer film with the injection-molding compound, in particular for the case where the carrier ply has a layer thickness of 75 µm and preferably consists of PET. In particular in the case of a layer thickness of the carrier ply, which preferably consists of PET, of at least 75 µm the height of the one or more forming elements is maintained or is just as high before the back-injection molding of the transfer film with the injection-molding compound as after the back-injection molding.

It has advantageously been shown that layer thickness of the carrier ply has no influence on the edge sharpness, with the result that the one or more forming elements do not need to have any coarser structures in relation to the edge sharpness. The edge sharpness describes the "sharpness" or precision or exactness with which the produced structures press through or show through the carrier film.

The decorative ply in particular has one or more decorative elements. The decorative ply and/or the one or more decorative elements preferably comprise one or more layers of the following layers: one or more color layers, in particular one or more colored varnish layers, one or more reflective layers, in particular one or more metal layers and/or one or more HRI layers (HRI=High Refractive Index), one or more optically active and/or optically variable structures, in particular one or more optically active relief structures, preferably one or more diffractive structures and/or holograms and/or refractive structures and/or matte structures. The one or more layers of the decorative ply and/or the one or more decorative elements have been or are preferably applied in the method for producing the transfer film. The one or more layers of the decorative ply and/or the one or more decorative elements can be present in each case over the whole surface or in each case partially. The one or more layers of the decorative ply and/or the one or more decorative elements can in each case overlap in areas of surface and/or be present next to one another in areas of surface. The arrangement next to one another can be present with a distance relative to one another or directly adjoining one another without a distance relative to one another.

Preferably, the one or more forming elements have been, in the transfer film, or are, in step c), arranged register-accurately with respect to the decorative ply in at least two different directions. The two different directions are in particular aligned orthogonal to one another and/or span a plane which is parallel to a main surface of the carrier ply. It is hereby possible for example, in the method for producing the transfer film, to apply the one or more forming elements register-accurately with respect to the decorative ply both in the running direction of the carrier ply and transverse to the running direction of the carrier ply, in particular to apply them register-accurately with respect to decorative elements separate from one another, for example separate motifs, of the decorative ply. It is in particular possible that at least one forming element of the one or more forming elements has been or is arranged register-accurately in each case with respect to at least one decorative element of one or more decorative elements, wherein the at least one decorative element preferably forms a separate motif. A separate motif is in particular not an endless motif and/or has visible boundary lines in the transfer film and/or the plastic injection-molded article in the two different directions. The one or more forming elements and the one or more decorative elements can in each case overlap in areas of surface and/or be present next to one another in areas of surface. The arrangement next to one another can be present with a distance relative to one another or directly adjoining one another without a distance relative to one another.

The register tolerance between the one or more forming elements and the decorative ply preferably lies in a range of from 0.05 mm to 1.0 mm, preferably in a range of from 0.05 mm to 0.2 mm. The register tolerance between the one or more forming elements and the decorative ply is in particular at most 1.0 mm, preferably at most 0.2 mm. It is thus also possible that the register tolerance between the molding and the decorative ply preferably lies in a range of from 0.05 mm to 1.0 mm, preferably in a range of from 0.05 mm to 0.2 mm, and/or is at most 1.0 mm, preferably at most 0.2 mm.

A register tolerance in the range of from 0.05 mm to 0.2 mm is in particular achieved when the one or more forming elements are applied by means of a digital printing method, preferably by means of inkjet printing, preferably UV inkjet printing. If the one or more forming elements are applied by means of screen printing, a register tolerance in the range of from 0.2 mm to 1.0 mm is in particular possible. The register tolerance is preferably achieved in each case between one or more forming elements of the one or more forming elements and one or more allocated decorative element of the one or more decorative elements.

Before the application of the one or more forming elements to the carrier ply of step c), the position of the decorative ply, in particular the position of one or more decorative elements which are allocated to one or more forming elements, is preferably detected by means of at least one sensor. The one or more forming elements are then preferably aligned, in dependence on the position of the decorative ply, in particular the position of one or more decorative elements which are allocated to one or more forming elements, during the application to the carrier ply in step c).

The transfer ply in particular has a masking area and/or a viewing area. The method preferably comprises the following step, in particular before and/or after step c): b1) preparing and/or producing a masking area and/or a viewing area in the transfer ply. The viewing area in the transfer ply is preferably produced in or after step b1) and/or the transfer ply of the transfer film preferably already has a viewing area in step b1).

The viewing area preferably has a transmittance which is higher in particular than the transmittance of the masking area, is preferably higher than the transmittance of the masking area by a value of at least 10% and/or in a range of from 10% to 100%. The viewing area preferably has a transmittance of more than 50%, in particular more than 75%. The masking area preferably has a transmittance of less than 50%, in particular less than 20%, preferably less than 5%. Here, the transmittance relates in particular to electromagnetic waves, preferably with wavelengths visible to the human eye.

In a possible embodiment, in the viewing area the transfer ply is in particular transparent for light which is visible to the human eye. In the masking area, the transfer ply is in particular opaque for light which is visible to the human eye. Opaque means in particular having a transmittance of from 0% to 10%. Transparent means in particular having a transmittance of from 10% to 100%.

The masking area is or has been formed in particular by means of a mask layer, which reduces the transmittance of the transfer ply in the masking area. It is possible in particular that the mask layer is used as a backlighting mask, for example when the plastic injection-molded article is equipped with one or more illuminants, in particular one or more LEDs and/or one or more displays.

The mask layer is in particular formed by means of one or more layers or comprises one or more layers which are selected from: one or more color layers, in particular one or more colored varnish layers, one or more reflective layers, in particular one or more metal layers and/or one or more HRI layers (HRI=High Refractive Index), one or more optically active and/or optically variable structures, in particular one or more optically active relief structures, preferably one or more diffractive structures and/or holograms and/or refractive structures and/or matte structures.

Expediently, at least one reflective layer of the one or more reflective layers has been or is arranged on the relief structure, in particular directly on the relief structure and/or arranged on the relief structure at least in areas or over the whole surface.

It is further possible that the one or more color layers are dyed, not dyed, differently dyed in each case, transparent and/or opaque. It is further possible that further transparent layers are arranged between the color layers. The one or more color layers preferably comprise one or more binders, colorants and/or pigments, in particular optically variable pigments and/or metallic pigments. It is further possible that the one or more color layers are formed of a polymethyl methacrylate(=PMMA)-based varnish. The one or more reflective layers are preferably opaque and/or transparent. It is further possible that the one or more reflective layers have been or are applied over the whole surface or partially. An HRI layer is in particular a layer with a high refractive index, preferably higher than 1.5. The one or more HRI layers comprise or preferably consist of one or more of the following materials: ZnS, $SiO_2$, $TiO_2$ and/or $ZrO_2$ and/or similar. The one or more metal layers comprise or preferably consist of one or more of the following materials: aluminum, chromium, indium, copper and/or alloys thereof. It is also possible that one or more reflective layers of the one or more reflective layers have several different properties of the above-named properties.

The above properties can in particular be exhibited by the one or more layers of the mask layer and/or the one or more layers of the decorative ply and/or one or more decorative elements. Further, the mask layer and/or the decorative ply can be single- or multi-layered.

The mask layer is or has been applied preferably by means of a digital printing method, in particular by means of inkjet printing, preferably UV inkjet printing, gravure printing and/or screen printing. The mask layer has in particular a layer thickness in a range of from 1 µm to 100 µm. A layer thickness of the mask layer in a range of from 1 µm to 50 µm is possible in particular when the mask layer has been applied by means of the digital printing method, preferably inkjet printing, preferably UV inkjet printing. A layer thickness of the mask layer in a range of from 1 µm to 30 µm is preferably possible when the mask layer has been applied by means of gravure printing. A layer thickness of the mask layer in a range of from 5 µm to 100 µm is preferably possible when the mask layer has been applied by means of screen printing.

It is also conceivable that the following step is carried out before and/or after step x3):

b2) producing a viewing area in the transfer ply, wherein the viewing area has been or is arranged register-accurately with respect to the one or more forming elements, the molding and/or the decorative ply and wherein the mask layer is partially removed in the viewing area and/or the transmittance of the transfer ply is increased in the viewing area. Here, the mask layer is preferably first also deposited in an area which, after a processing of the mask layer, forms the viewing area in this area. In particular, the viewing area is produced here by means of a laser. The viewing area is particularly preferably produced by means of a laser after step x3) has been carried out, in particular wherein the transfer film has been back-injection molded with the injection-molding compound and after the injection-molding compound has hardened.

The one or more forming elements and the viewing area and/or the masking area, in particular the mask layer, advantageously are or have been arranged register-accurately with respect to one another in the transfer film. In the method, in particular during step c) and/or during step b1), the one or more forming elements and the viewing area and/or the masking area, in particular the mask layer, are arranged register-accurately with respect to one another.

The register tolerance between the one or more forming elements and the viewing area and/or the masking area, in particular between the one or more forming elements and the mask layer, preferably lies in a range of from 0.05 mm to 1.0 mm, preferably in a range of from 0.05 mm to 0.2 mm. The register tolerance between the one or more forming elements and the viewing area and/or the masking area, in particular between the one or more forming elements and the mask layer, is in particular at most 1.0 mm, preferably at most 0.2 mm. It is thus also possible that in particular the register tolerance between the molding and the viewing area and/or the masking area, in particular between the molding and the mask layer, preferably lies in a range of from 0.05 mm to 1.0 mm, preferably in a range of from 0.05 mm to 0.2, and/or is at most 1.0 mm, preferably at most 0.2 mm.

The register tolerance in the range of from 0.05 mm to 0.2 mm is in particular achieved when the one or more forming elements are applied by means of a digital printing method, preferably by means of inkjet printing, preferably UV inkjet printing. If the forming elements are applied by means of screen printing, the register tolerance in the range of from 0.2 mm to 1.0 mm is in particular possible.

The register tolerance between decorative ply and the viewing area and/or the masking area, in particular between the decorative ply and the mask layer, preferably lies in a range of from 0.1 mm to 0.4 mm and/or is at most 0.4 mm. The register tolerance in the range of from 0.1 mm to 0.4 mm is achieved in particular when the mask layer has been or is applied, preferably in-line, by means of a gravure printing method. Here, the mask layer is carried out in particular in-line with step c). It is further possible that the application of the decorative ply is carried out in-line with the application of the mask layer and in particular step c).

Method steps which are carried out "in-line" are in particular carried out directly one after another or at the same time. Here, the carrier ply is preferably unrolled from a roll and in particular not rolled up or temporarily stored between the steps. It is further also possible that the application of the decorative ply, the mask layer, the separating layer, the protective layer and/or the primer is carried out in-line.

In particular, it is made possible that the plastic injection-molded article has a viewing area and/or a masking area, in particular formed by means of a mask layer, register-accurate with respect to the molding and to the decorative ply. Thus it is possible for example to backlight the viewing area and to make an interaction by means of further functional component parts, such as for example touch sensors, possible, which can be carried out particularly easily, intuitively or precisely.

It is further possible that the maximum register tolerance between the one or more forming elements and/or the decorative ply and/or the viewing area and/or the masking area, in particular the mask layer, lies in a range of from 0.15 mm to 0.6 mm. It is thus also possible that the maximum register tolerance between the molding and/or the decorative ply and/or the viewing area and/or the masking area, in particular the mask layer, lies in a range of from 0.15 mm to 0.6 mm. Here, the maximum register tolerance in particular indicates the maximum deviation from a target value of the position of two of the named components relative to one another.

The viewing area is or has been formed in particular by one or more voids and/or open areas, in particular in the mask layer and/or comprises one or more voids and/or open areas, in particular in the mask layer. It is further possible that the viewing area is arranged congruent with the one or more forming elements at least in partial areas and/or that the masking area does not overlap the one or more forming elements. For example, it is possible that the viewing area is or has been formed of the one or more voids and/or open areas in an opaque layer and/or comprises the one or more voids and/or open areas, wherein the opaque layer for example forms the masking area or a part thereof and/or the mask layer. In particular also in the plastic injection-molded article or in the method for the production thereof it is possible that the viewing area has been or is formed by one or more voids and/or open areas, in particular in the mask layer and/or comprises one or more voids and/or open areas, in particular in the mask layer. It is hereby possible that the viewing area is arranged congruent with the molding and/or the recessed area of the transfer ply at least in partial areas and/or that the masking area does not overlap the molding. It is conceivable here that the one or more voids and/or open areas are at least partially filled with the transfer ply. It is in particular possible that during the back-injection molding of the transfer film with the injection-molding compound in step x3) the transfer ply is deformed in such a way that the one or more open areas and/or voids are at least partially filled with the transfer ply. In particular the edge sharpness of the molding and the register accuracy can hereby be improved.

By congruent is preferably meant here that the boundary lines of the one or more forming elements and of the viewing area, in particular when viewed perpendicularly onto a plane spanned by the transfer film, preferably the viewing area, overlap one another.

It is further possible that the transfer ply has been or is provided with at least one first protective layer in particular for the formation of an outer surface of the transfer ply facing the carrier ply. It is possible here that the first protective layer is provided at least in areas and/or over the whole surface in the transfer ply. The protective layer is in particular a protective varnish layer. The protective layer preferably has a layer thickness in a range of from 2 μm to 10 μm.

The at least one first protective layer preferably contains at least one binder which is selected from the group which consists of polyurethane resins, polyurethane dispersions, acrylic resins, methacrylic resins, phenolic resins, epoxy resins, polyureas, melamine resins, aminoplasts, polyester resins, alkyd resins, polyamide resins, vinyl ester resins and mixtures thereof, preferably polyurethane resins, polyurethane dispersions, phenolic resins, epoxy resins, polyureas, melamine resins, aminoplasts, polyester resins, alkyd resins, polyamide resins and mixtures thereof.

The at least one first protective layer, in particular in a not yet completely cured state, preferably comprises at least one binder which has free isocyanate groups and/or free groups reactive to isocyanate groups, preferably amino groups and/or hydroxyl groups, and/or in each case correspondingly capped analogs thereof.

Suitable binders are preferably selected from the group which consists of polyurethane resins, polyurethane dispersions, phenolic resins, epoxy resins, polyureas, melamine resins, aminoplasts, polyester resins, alkyd resins, polyamide resins and mixtures thereof, further preferably polyurethane resins, polyurethane dispersions, phenolic resins, polyureas, melamine resins, aminoplasts, polyester resins, alkyd resins, polyamide resins and mixtures thereof.

Further preferably, the at least one first protective layer, in particular in a not yet completely cured state, comprises the at least one binder which has free isocyanate groups and/or free groups reactive to isocyanate groups, preferably amino groups and/or hydroxyl groups, and/or in each case correspondingly capped analogs thereof, in a proportion of at least 15 wt.-% (wt.-%=percent by weight), preferably from a range of from 20 wt.-% to 90 wt.-%, in each case relative to the total weight of the layer.

Further preferably, the at least one binder which is contained in the at least one first protective layer, in particular in a not yet completely cured state, has no free, ethylenically unsaturated groups. In a preferred embodiment, the at least one first protective layer, in particular in a not yet completely cured state, comprises or consists of at least one aqueous, uncrosslinked or crosslinked polyurethane dispersion, which preferably has free groups reactive to isocyanate groups, further preferably amino groups and/or hydroxyl groups, or at least one uncrosslinked or crosslinked polyurethane resin, which preferably has isocyanate groups and/or capped analogs thereof or groups reactive to isocyanate groups, further preferably amino groups and/or hydroxyl groups, and/or in each case correspondingly capped analogs thereof.

It is in particular possible that the protective varnish layer has been or is formed of a PMMA-based varnish. It is further possible that the protective varnish layer comprises or consists of a radiation-curing dual cure varnish. A dual cure varnish has been or is thermally pre-crosslinked in particular in a first step during and/or after application thereof in liquid form. Further, the dual cure varnish has been or is radically post-crosslinked in a second step after the processing of the transfer film, in particular after the back-injection molding of the transfer film with the injection-molding compound and/or preferably after the molding has been formed in step x3), in particular via high-energy radiation, preferably UV radiation. Dual cure varnishes of this type can consist of different polymers or oligomers, which have unsaturated acrylate or methacrylate groups. These functional groups are, in the second step, or have been radically crosslinked with one another. For the thermal pre-crosslinking in the first step, at least two or more alcohol groups are preferably present in the case of these polymers or oligomers. These alcohol groups can be crosslinked with multifunctional isocyanates or melamine formaldehyde resins. UV raw materials, such as in particular epoxy acrylates, polyether acrylates, polyester acrylates and/or acrylic acrylates, are preferably used as preferably unsaturated oligomers or polymers. Blocked and/or unblocked representatives based on TDI (TDI=toluene-2,4-diisocyanate), HDI (HDI=hexamethylene diisocyanate) or IPDI (IPDI=isophorone diisocyanate) are preferably used as isocyanate. It is possible that melamine crosslinkers are used which have been or are in particular fully etherified and/or comprise or consist of imino types and/or benzoguanamine. It can also be provided that the first protective layer is formed as a protective varnish made of a varnish based on non-UV-crosslinkable PMMA (PMMA=polymethyl methacrylate).

The first protective layer, in particular in the form of the protective varnish layer, preferably has been or is applied by means of gravure printing and/or slot casting, preferably applied to the carrier ply.

The carrier ply in particular comprises or consists of one of the following materials or a combination of the following materials: polyethylene terephthalate (PET), polymethyl methacrylate (PMMA), polycarbonate (PC) or biaxially oriented polypropylene (BOPP). The carrier ply has in particular a layer thickness in a range of from 12 µm to 100 µm, preferably in a range of from 50 µm to 75 µm. A sufficiently thick carrier ply guarantees in particular that the transfer film is not damaged during the back-injection molding with the injection-molding compound, for example by preventing edges of the one or more forming elements from pressing through the carrier ply too strongly.

The carrier ply in particular has a degree of elongation at break in a range of from 110% to 135%. The degree of elongation is in particular the quotient of the length of the carrier ply in the direction of an elongation in relation to the corresponding length of the carrier ply in the unstretched state. By the degree of elongation is in particular also meant an average stretchability. It is further possible that the carrier ply has a tensile strength in a range of from 15 kpsi to 50 kpsi, preferably in a range of from 27 kpsi to 31 kpsi and/or a modulus of elasticity in a range of from 100 kpsi to 1000 kpsi, preferably in a range of from 300 kpsi to 700 kpsi.

It is possible that the carrier ply is uncoated. It is further possible that the carrier ply is provided with a coating or has a coating on at least one of its main surfaces, and in particular at least on its side facing away from the transfer ply, or both of its main surfaces. The coating has been or is in particular formed of a polymer. It is herewith possible, for example, that the side of the carrier ply which is provided with the one or more forming elements and/or is provided for the application of the one or more forming elements has the coating, which in particular guarantees a sufficient adhesion of the one or more forming elements to the carrier ply. It is further possible that the coating serves to protect the transfer ply during transport or back-injection molding. The coating of the carrier ply preferably has a layer thickness in a range of from 0.2 µm to 5 µm, preferably in a range of from 1 µm to 3 µm. The coating of the carrier ply is in particular formed of one or more of the following components, comprises one or more of the following components or consists thereof: polyacrylates, polymethacrylates, polyurethanes, in particular polyester polyols, polyether polyols, polycarbonate polyols and/or polyacrylate polyols, polyesters, polyethers, polyolefins, epoxy resins and/or derivatives of the named components.

It is further possible that the coating of the carrier ply has been or is crosslinkable or crosslinked, in particular by one or more of the following components: isocyanates, carbodiimides, melamines, aziridines and/or derivatives of the named components. The coating of the carrier ply is preferably radiation-curable. The coating in particular has been or is radiation-cured. The coating preferably contains a dual cure varnish. With respect to the dual cure varnish, reference is made in particular to the above statements.

Further, it is expedient that the transfer film is or has been provided with a primer layer, in particular for the formation of an outer surface of the transfer ply facing away from the carrier ply. The primer layer is in particular an adhesive layer and/or an adhesion-promoter layer, preferably comprising or consisting of one or more of the following substances: PMMA, PVC, polyester, polyurethanes, chlorinated polyolefins, polypropylene, epoxy resins, polyurethane polyols in combination with inactivated isocyanates, inorganic fillers. The primer layer has in particular a layer thickness in a range of from 1 µm to 50 µm. It is further possible that the primer layer is or has been applied by means of inkjet printing, gravure printing, screen printing and/or slot casting.

It is also expedient that the transfer film has a separating layer between the carrier ply and the transfer ply. The carrier ply is preferably detachable from the transfer ply by means of the separating layer.

In particular it is possible that the decorative ply is arranged indirectly on the carrier ply and one or more layers, such as for example the separating layer, are arranged between the carrier ply and the decorative ply.

The separating layer preferably has a layer thickness in a range of from 0.1 µm to 50 µm. It is possible that the separating layer contains one or more wax systems, in particular selected from one or more of the following waxes: carnauba wax, beeswax, montanic acid ester, polyethylene wax, polypropylene wax and/or polytetrafluoroethylene wax (polytetrafluoroethylene=PTFE). It is further possible that the separating layer contains one or more layers of melamine formaldehyde resin-crosslinked varnishes and/or surface-active substances, such as in particular silicones.

The separating layer preferably has been or is applied by means of gravure printing and/or slot casting, preferably applied to the carrier ply.

It is in particular possible that the method for producing the plastic injection-molded article contains the following step: x4) separating the carrier ply from the transfer ply by means of and/or with the separating layer. In the plastic injection-molded article, the transfer ply is preferably detached from the carrier ply. It is thus possible that the plastic injection-molded article in particular does not contain the carrier ply and the one or more forming elements of the transfer film.

It is further possible that the plastic injection-molded article has been provided with one or more functional component parts and/or is provided with one or more functional component parts during or after the back-injection molding of the transfer film with the injection-molding compound. Here, the one or more functional component parts have been or are in particular arranged on the side of the injection-molding compound lying opposite the transfer ply.

The one or more functional component parts preferably have at least one of the following components: one or more sensors, in particular one or more touch sensors, one or more illuminants, in particular one or more displays, one or more LEDs, one or more light-conducting component parts, one or more printed circuit boards and/or combinations thereof.

By means of the one or more illuminants, a backlighting is integrated into the plastic injection-molded article, for example. It is possible that a backlighting is prepared as a separate component part comprising one or more LEDs on a printed circuit board for this purpose, wherein the one or more LEDs are preferably connected to the printed circuit board via a soldered connection. The one or more illuminants, in particular in the form of LEDs, preferably the backlighting, preferably have been or are arranged in particular overlapping the viewing area register-accurately, preferably directly behind and/or in the viewing area.

It is further possible that the plastic injection-molded article contains one or more diffuser layers and/or one or more light-guide layers. The one or more illuminants, in particular in the form of LEDs, preferably in the form of the backlighting, preferably are or have been integrated into the plastic injection-molded article by means of gluing, screwing, ultrasonic welding, soldering, clamping, heat staking, infrared welding.

The one or more illuminants, preferably one or more LEDs, have been, in the plastic injection-molded article, or are, in particular before the back-injection molding of the transfer film in step x3), arranged preferably on the side of the transfer ply facing away from the carrier ply and/or are connected to the transfer ply during the back-injection molding and optionally to the transfer ply via the injection-molding compound. It is further possible that the one or more illuminants, preferably the one or more LEDs, are or have been introduced into the plastic injection-molded article, in particular after the back-injection molding with the plastic compound of step x3), in particular wherein the illuminants are or have been introduced into the injection-molding compound and/or connected to the injection-molding compound.

It is possible that the one or more sensors, in particular touch sensors, are or have been arranged on or within the transfer film before the transfer film is back-injection molded with the injection-molding compound. It is further possible that the one or more sensors, in particular the one or more touch sensors, preferably are or have been arranged on the side of the transfer ply facing away from the carrier ply before the back-injection molding of the transfer film in step x3) and are or have been connected to the transfer ply during the back-injection molding and optionally to the transfer ply via the injection-molding compound.

It is possible that at least one sensor, in particular at least one touch sensor, of the one or more sensors is preferably not part of the transfer film and/or is not integrated into the plastic injection-molded article as part of the transfer film. It is further possible that this at least one sensor, in particular touch sensor, is applied subsequently, preferably to the side of the injection-molding compound lying opposite the transfer ply. It is possible here that the at least one sensor is or has been glued, preferably extensively, into an optional open area formed by the geometry of the component part with the injection-molding compound.

It is further possible that the one or more touch sensors, after the back-injection molding with the plastic compound of step x3), are introduced into the plastic injection-molded article, in particular are connected to the injection-molding compound and/or fastened to the injection-molding compound.

It is further possible that the one or more sensors, in particular the one or more touch sensors, are introduced by means of gluing, laminating, In-Mold Labeling (=IML) and/or Functional Foil Bonding (=FFB).

During the laminating, the one or more sensors, preferably touch sensors, are stuck, in particular manually and/or by machine, in the injection-molding compound, in particular after the curing of the injection-molding compound. For this, in particular an adhesive layer, preferably a transparent adhesive layer, further preferably an OCA (OCA=optically clear adhesive=optically high-quality, double-sided adhesive tape and/or adhesive film) has been or is arranged on one side of the one or more sensors.

In the case of IML (=In-Mold Labeling), before an injection of the injection-molding compound, the one or more sensors, in particular touch sensors, are placed, preferably manually and/or by machine, for example by means of a robot, in the injection molding machine, expediently arranged between the mold halves of the injection molding machine. A primer which guarantees an adhesion to the injection-molding compound has been or is previously arranged on the rear side of the one or more sensors, preferably touch sensors. Through the injection of the injection-molding compound, the one or more sensors, in particular touch sensors, are here connected to the injection-molding compound. It is further possible to back-injection mold the transfer film at the same time as the injection of the injection-molding compound. It is possible herewith to decorate a front side of the plastic injection-molded article with the transfer film and at the same time to apply the one or more sensors, in particular touch sensors, to the rear side of the plastic injection-molded article.

In the case of FFB (FFB=Functional Foil Bonding) the one or more sensors (9), in particular touch sensors, are preferably stamped onto the plastic injection-molded article at elevated temperatures and pressures with the aid of a vertical stamping machine or also a roll-off machine. For this, the one or more sensors, in particular touch sensors, preferably have a primer, which guarantees the adhesion to the plastic injection-molded article, on the rear side.

The one or more functional component parts and the one or more forming elements, the molding, the decorative ply, the viewing area and/or the masking area, preferably the mask layer, preferably have been or are arranged register-accurately with respect to one another. It is further possible that the register tolerance between the one or more functional component parts and the one or more forming elements, the molding, the decorative ply, the viewing area and/or the masking area, in particular the mask layer, is at most 0.3 mm, in particular at most 0.2 mm. Here, the one or more functional component parts are in particular the one or more sensors, preferably one or more touch sensors, and/or the one or more illuminants, in particular the one or more LEDs and/or the one or more displays. Further preferably, the register tolerance between the molding and the one or more functional component parts, in particular the one or more sensors, preferably touch sensors, and/or the one or more illuminants, preferably displays and/or LEDs, is at most 0.3 mm, in particular using IML and/or laminating. Further preferably, the register tolerance between the decorative ply and the one or more functional component parts, in particular the one or more sensors, preferably touch sensors, and/or the one or more illuminants, preferably displays and/or LEDs, is at most 0.2 mm, in particular using FFB.

For carrying out step c) and/or in step c), in particular the position in which the one or more forming elements are applied to the carrier ply is set in dependence on the position of one or more registration marks. For this, the one or more registration marks are in particular detected by means of at least one sensor, wherein the position of one or more layers of the decorative ply, in particular the one or more decorative elements, the viewing area, the masking area, in particular the mask layer, the first protective layer and/or the primer layer, in relation to the carrier ply and/or one another is detected by means of the one or more registration marks.

For one or more layers, in particular every layer, of the decorative ply, in particular the one or more decorative elements, the viewing area, the masking area, in particular the mask layer, the first protective layer and/or the primer layer, corresponding registration marks allocated to the respective layer have been or are applied and/or produced, preferably during the application of the respective layer. Such registration marks are for example crosses, circles and/or triangles. The registration marks are preferably applied in each case on at least one outside and/or one edge of the transfer film, with the result that they can be read, in particular by means of at least one sensor. It is also possible that at least parts of one or more motifs of the decorative ply and/or of the mask layer are used as registration marks. In particular, in a subsequent step, the one or more forming elements and preferably associated registration marks are applied to the side of the carrier ply lying opposite the transfer ply.

It is further possible that, during the provision of the plastic injection-molded article with the one or more functional component parts, the position of the one or more functional component parts is or has been aligned with reference to the allocated registration marks of one or more layers of the decorative ply, in particular the one or more decorative elements, the viewing area, the masking area, in particular the mask layer, the first protective layer, the primer layer and/or the one or more forming elements.

In particular, for the application of one or more touch sensors, a printed and/or sprayed sensor outline is used. The printed and/or sprayed sensor outline is a marking printed and/or sprayed on the respective transfer film or present in the injection-molded article due to the mold design. The printed and/or sprayed sensor outline is or has been arranged preferably with respect to one or more registration marks of the registration marks allocated to the one or more forming elements, the decorative ply, the viewing area and/or the masking area, in particular the mask layer. The respective touch sensor is register-accurately connected to the plastic injection-molded article and the components thereof, preferably by means of the printed and/or sprayed sensor outline, in particular due to a corresponding mold design and registration marks.

It is also possible that the method for producing the plastic injection-molded article further comprises the following step, in particular after the separating of the carrier ply of step x4):

flooding the transfer ply and/or the injection-molding compound at least in areas with a polyurethane-containing composition and/or with a polyurea-containing composition, in particular for the formation of at least one second protective layer. It is thus possible that on an outer surface, preferably on the transfer ply, the plastic injection-molded article has at least one second protective layer formed with a polyurethane-containing composition and/or with a polyurea-containing composition.

Here, at least the molding and/or an area comprising the molding and/or a motif formed by the molding has been or is preferably flooded. It is hereby achieved in particular that, although the plastic injection-molded article looks haptic, it is haptically smooth when stroked. It is herewith possible to give the plastic injection-molded article a particular optical depth effect at this location through the combination of the molding and the polyurethane flooding and/or the polyurea flooding.

The at least one first protective layer and the at least one second protective layer are advantageously matched to one another. In relation to the polyurethane flooding and/or the polyurea flooding, a distinction is drawn in particular between a flooding in the context of an IMD method and an open flooding. Here, the polyurethane flooding and/or the polyurea flooding is carried out in particular in the context of an IMD process, thus preferably in a closed system.

The flooding with a polyurethane-containing composition is carried out in particular in the context of the back-injection molding of the transfer ply with the injection-molding compound, preferably during or immediately after step x3), thus preferably in a closed system, in particular in a closed state of the mold halves of the injection molding machine. A preferably flowable polyurethane reaction mixture used in particular for the polyurethane-containing composition preferably consists of polyurethane precursors (2C PUR systems, PUR=polyurethane) and/or mixtures thereof, which preferably likewise have free, reactive groups, preferably isocyanate groups or groups reactive to isocyanate groups, preferably polyol groups, and/or in each case corresponding capped, reactive groups which liberate the corresponding reactive group again at a temperature from a range of from 30° C. to 180° C.

During the curing, preferably complete curing, of the at least one first protective layer of the transfer ply and/or the at least one second protective layer in particular applied thereto, for example free isocyanate groups which are contained in the at least one first protective layer of the transfer ply can therefore react with free groups, reactive to isocyanate groups, of the preferably flowable, two-component polyurethane-containing composition used to produce the at least one second protective layer. In each case the adhesion of the at least one second protective layer to the at least one first protective layer of the transfer ply is thereby preferably significantly improved after the curing.

The at least one flowable, polyurethane-containing reaction mixture, in particular as described above, can preferably be applied to the at least one first protective layer of the transfer ply as a composition comprising polyurethane precursors (2C PUR systems), in particular as a mixture of at least one of the above-named compounds having two or more isocyanate groups and at least one of the above-named compounds which has two or more groups reactive to isocyanate groups, wherein preferably either the at least one compound having two or more isocyanate groups or the at least one compound which has two or more groups reactive to isocyanate groups can be used in a molar excess. Further preferably, the one preferably flowable, polyurethane-containing reaction mixture used to produce the at least one second protective layer is anhydrous.

When two-component polyurethane systems are used, the polyurethane precursors, preferably polyol-containing and polyisocyanate-containing components, are preferably stored separately and in particular only combined in the mixing head when required. The heat of reaction formed during the reaction of the polyurethane precursors preferably results in particular in a heating to a temperature of from 60° C. to 180° C., preferably from 80° C. to 120° C.

It is also possible that the flooding with the polyurethane-containing composition is carried out in the context of an open flooding.

In the open flooding, in particular the surface tension of the solvent-free or solvent-containing, preferably flowable, polyurethane-containing reaction mixture used to produce the at least one second protective layer is in particular utilized in the outer edge area of the component part to be flooded. In particular, here the at least one second protective layer is preferably flooded without a mold-contour-giving shape onto the component part, in particular the plastic injection-molded article. The curing is preferably effected in particular through appropriate storage, preferably for a period in a range of from 2 s to 60 s, of the flooded plastic injection-molded article at a temperature from a range of from 20° C. to 100° C.

A preferably flowable polyurea reaction mixture used in particular for the polyurea-containing composition preferably consists of polyurea precursors (2C PUA systems, PUA=polyurea) and/or mixtures thereof, which preferably likewise have free, reactive groups, preferably isocyanate groups or groups reactive to isocyanate groups, preferably (poly)amine groups, and/or in each case corresponding capped, reactive groups which liberate the corresponding reactive group again at a temperature from a range of from 30° C. to 180° C. During the curing, preferably complete curing, of the at least one first protective layer for example free isocyanate groups which are contained in the at least one first protective layer can therefore react with free groups, reactive to isocyanate groups, of the preferably flowable, two-component polyurea-containing composition used to produce the at least one second protective layer. In each case the adhesion of the at least one second protective layer to the at least one first protective layer of the transfer ply is thereby preferably significantly improved after the curing.

The preferably flowable, polyurea-containing reaction mixture, as described above, can in particular be applied to the at least one first protective layer of the transfer ply as a composition comprising polyurea precursors (2C PUA systems), in particular as a mixture of at least one of the above-named compounds having two or more isocyanate groups and at least one of the above-named compounds which has two or more groups reactive to isocyanate groups, wherein preferably either the at least one compound having two or more isocyanate groups or the at least one compound which has two or more groups reactive to isocyanate groups can be used in a molar excess.

Further preferably, the one preferably flowable, polyurea-containing reaction mixture used to produce the at least one second protective layer is anhydrous.

When two-component polyurea systems are used, the polyurea precursors, preferably the (poly)amine-containing and/or polyisocyanate-containing components, are preferably stored separately and only combined in the mixing head when required. The heat of reaction formed during the reaction of the polyurea precursors preferably results in a heating to a temperature of from 60° C. to 180° C., preferably from 80° C. to 120° C.

BRIEF DESCRIPTION OF THE DRAWINGS

In the following, the invention is explained by way of example with reference to several embodiment examples with the aid of the enclosed drawings. There are shown in.

DETAILED DESCRIPTION

Figure 1:
FIG. 1 schematically, a method for producing a transfer film.

FIG. 1 shows, schematically, a method for producing a transfer film. The transfer film is in particular an IMD transfer film. Here, the following steps are carried out, in particular in the specified order:
   a) preparing 101 a carrier ply,
   b) preparing 102 a transfer ply comprising a decorative ply, wherein the transfer ply has been or is arranged on the carrier ply,
   c) applying 103 one or more forming elements to the carrier ply, wherein the one or more forming elements have a three-dimensional shape and are applied register-accurately with respect to the decorative ply.

Figure 2:
FIG. 2 schematically, a method for producing a plastic injection-molded article, FIGS. 3a, 3b, 3c schematically, a transfer film and a plastic injection-molded article, FIGS. 4a, 4b, 4c schematically, a transfer film and a plastic injection-molded article, FIGS. 5a, 5b, 5c schematically, a transfer film and a plastic injection-molded article, FIGS. 6a, 6b, 6c schematically, a transfer film and a plastic injection-molded article, FIGS. 7a, 7b, 7c schematically, a transfer film and a plastic injection-molded article, FIG. 8 schematically, a plastic injection-molded article, FIG. 9 schematically, a transfer film FIGS. 10a, 10b schematically, a positive forming element before and after the back-injection molding, FIGS. 11a, 11b schematically, a negative forming element before and after the back-injection molding.

FIG. 2 shows, schematically, a method for producing a plastic injection-molded article which is coated with a transfer film. The transfer film is in particular an IMD transfer film. It is possible here that the transfer film is a transfer film as described for the other figures and/or is produced with a method described for them. The method for producing the plastic injection-molded article comprises at least the following steps, in particular in the specified order:
   x1) preparing 201 a transfer film, wherein the transfer film has a carrier ply, and has a transfer ply comprising a decorative ply, wherein the transfer ply has been or is arranged on the carrier ply,
   x2) preparing 202 one or more forming elements on the carrier ply, wherein the one or more forming elements have a molding and have been or are applied register-accurately with respect to the decorative ply, x3) back-injection molding 203 the transfer film with an injection-molding compound, wherein, through the action of the injection-molding compound on the transfer film, a molding of the three-dimensional shape of the one or more forming elements is introduced into the transfer ply register-accurately with respect to the decorative ply.

FIG. 3a shows, schematically, a transfer film 1. The transfer film 1 is in particular an IMD transfer film. The transfer film 1 is preferably produced as is described for example in relation to FIG. 1. The transfer film 1 has a carrier ply 3 and a transfer ply 2. The transfer ply 2 comprises a decorative ply 21 and is arranged on the carrier ply 3. The transfer film 1 further comprises a forming element 40, wherein the forming element 40 is applied to the carrier ply 2 and register-accurately with respect to the decorative ply 21. It is also possible that several forming elements 40 are arranged on the carrier ply 3.

During the back-injection molding 203 of the transfer film 1 with the injection-molding compound, the one or more forming elements 40 in particular rest against a mold half of the injection molding machine. The injection-molding compound can adhere to the transfer film 1, in particular to the exposed side of a primer, on the side of the transfer film 1 lying opposite the one or more forming elements 40. After the back-injection molding 203, a plastic injection-molded article 10 as shown by way of example in FIG. 3b or FIG. 3c can be obtained.

FIG. 3b shows, schematically, a plastic injection-molded article 10. The plastic injection-molded article 10 is, for example, produced as is described in relation to one of FIGS. 1, 2 and 3a. The plastic injection-molded article 10 comprises an injection-molding compound 5 and a transfer ply 2 of a transfer film 1 back-injection molded with the injection-molding compound 5. The transfer film 1 is in particular an IMD transfer film, preferably as is described in relation to FIG. 1 and/or FIG. 3a and/or produced as is described in relation to FIG. 1 and/or FIG. 3a. The transfer ply 1 comprises a decorative ply 21 and has a molding 41 of a three-dimensional shape. Here, the molding 41 is introduced register-accurately with respect to the decorative ply 21.

Figure 3:
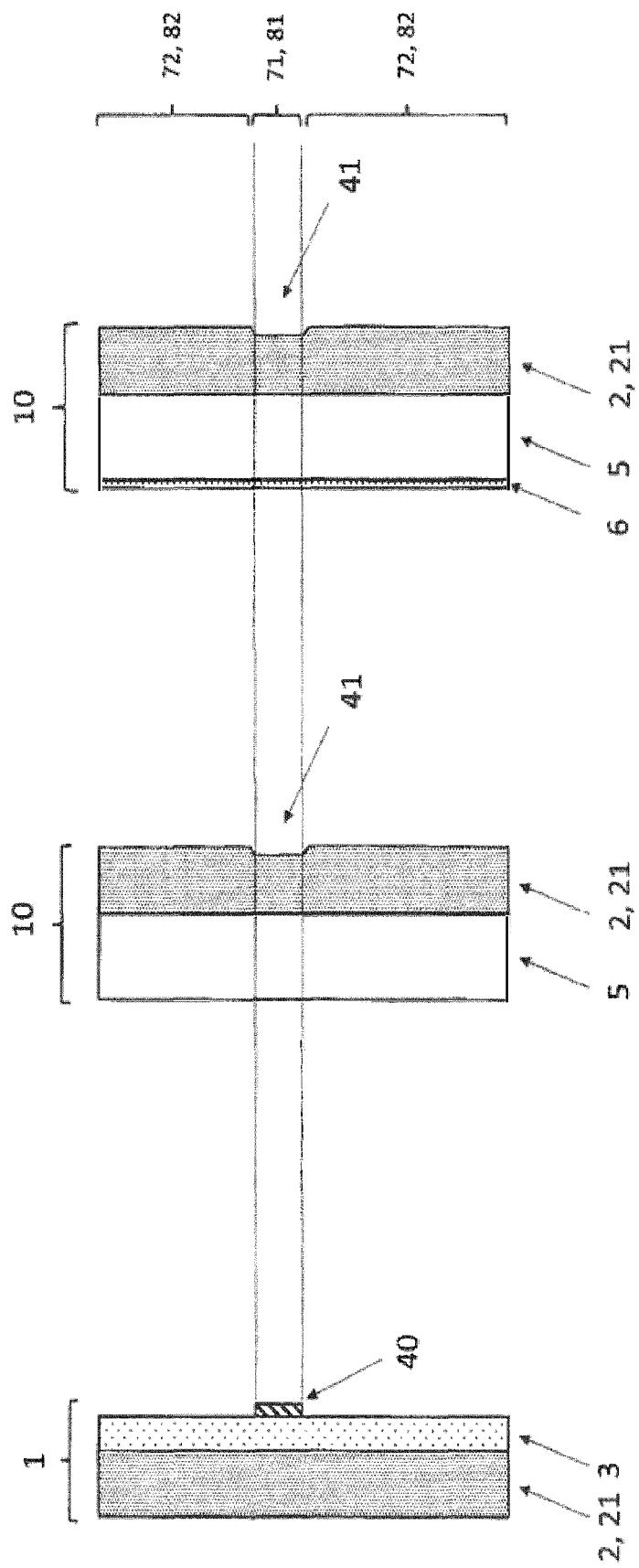

A viewing of areas, such as for example the areas 71, 72, 81 and 82, takes place in particular onto a main surface spanned by a respective layer or the transfer film 1, in FIG. 3 preferably from right to left or vice versa. Preferably when viewed perpendicularly onto a plane and/or main surface spanned by the transfer film 1 or a respective layer, areas, and in particular also partial areas, preferably comprise all parts of the transfer film 1 and/or of the plastic injection-molded article 10 overlapping this plane and/or main surface.

The molding 41 of the plastic injection-molded article has been or is in particular formed by means of the one or more forming elements 40. Thus, the molding 41 in particular forms a shape complementary to the three-dimensional shape of the one or more forming elements 40. As is shown by way of example in FIG. 3b and FIG. 3c, the one or more forming elements 40 can preferably be removed from the plastic injection-molded article 10 in particular together with the carrier ply 3. It is also conceivable that at least the carrier ply 3 and optionally the one or more forming elements 40 and/or residues thereof still adhere to the plastic injection-molded article 10. A protection of the surface of the plastic injection-molded article 10 can herewith be guaranteed in particular, e.g. during transport and/or storage.

In the areas in which no forming elements are arranged, the carrier ply 3 is pressed against the mold half at least in areas during the back-injection molding 203 of the transfer film with the injection-molding compound 5 of step x3) and the molding 41 of the one or more forming elements 40 in the transfer ply 21 is thereby formed, wherein here the molding 41 in particular makes the haptics and/or the depth effect possible.

The one or more forming elements 40 have, here in particular in comparison with the carrier ply 3 and the transfer ply 2, a three-dimensional shape because in particular both the height of the forming element 40 and the dimensions in the other spatial directions contribute significantly to the design of the forming element 40, which is the case in particular since the height of the molding 41 of the plastic injection-molded article 10 herewith turns out to be dependent on the design of the forming element 40. The three-dimensional shape for example comprises a two-dimensional motif and the two-dimensional motif has been or is preferably provided with a spatial structure, for example by increasing the thickness or height of the two-dimensional motif, here along the horizontal, in particular in a targeted manner.

The carrier ply 3 is preferably a PET carrier ply. With respect to further possible materials and an optional coating of the carrier ply 3, reference is made in particular to the above statements. The carrier ply 3 for example has a layer thickness of 75 μm, which is the case in particular for use in the automotive sector. It is also possible that the carrier ply 3 has a layer thickness of 50 μm, for example for the production of laptop sleeves. It is in particular possible that the carrier ply 3 has a degree of elongation at break in a range of from 110% to 135%. The degree of elongation is in particular the quotient of the length of the carrier ply in the direction of an elongation in relation to the corresponding length of the carrier ply in the unstretched state. By the degree of elongation is in particular also meant an average stretchability. For example, the carrier ply in particular has an average stretchability of 25%. Here, the direction of the average stretchability is in particular based on an X direction and/or a Y direction. Here, the X direction, for example in FIG. 3a, preferably points along a horizontal and/or the Y direction, for example in FIG. 3a, points along a vertical. It is further possible that the carrier ply has a tensile strength in a range of from 15 kpsi to 50 kpsi, preferably in a range of from 27 kpsi to 31 kpsi and/or a modulus of elasticity in a range of from 100 kpsi to 1000 kpsi, preferably in a range of from 300 kpsi to 700 kpsi.

It is further possible that during step b) the preparing comprises an application of the transfer ply comprising at least the decorative ply 21 to the carrier ply 3. The one or more forming elements 40 are preferably partially applied to the carrier ply 3. It is also possible that the one or more forming elements 40 have been or are applied in partial areas with a greater thickness than in other partial areas. An application of the one or more forming elements 40 to the carrier ply 3 can in particular take place directly to the carrier ply 3 or indirectly via one or more further layers. A height or thickness, for example in FIG. 3b, is in particular measured along a horizontal line.

The transfer ply 2 is preferably first applied to the carrier ply 3 and then in particular the one or more forming elements 40 are applied to the carrier ply 3 register-accurately at least with respect to the decorative ply 21, in particular to the side of the carrier ply 3 lying opposite the transfer ply 2.

One or more first layers of the one or more forming elements 40 in particular contain or consist of a digital printing ink. The digital printing ink is preferably an inkjet printing ink, preferably a UV inkjet printing ink. In particular, in the method for producing the transfer film 1, in step c) one or more first layers of the one or more forming elements 40 are applied using a digital printing method, preferably an inkjet printing method, preferably a UV inkjet printing method. It is further possible that one or more layers of the one or more forming elements are crosslinkable or crosslinked, in particular by means of radiation, preferably UV radiation. By means of a digital printing method it is in particular achieved that a small batch size, in particular a batch size of one, can be realized. Further, the register tolerance is improved by means of digital printing methods, in particular UV inkjet printing methods. In the digital printing method, one or more layers are preferably printed by means of one or more printing inks selected from CMYK inks (CMYK=Cyan, Magenta, Yellow, Black).

It is furthermore also conceivable that, in particular in step c), one or more layers of the one or more forming elements 40 have been or are applied by means of gravure printing and/or screen printing. It is thus also possible that one or more layers of the one or more forming elements 40 of the transfer film comprise a gravure printing ink and/or a screen printing ink.

It is in particular possible that the one or more forming elements 40 are single-layered or multi-layered. In step c) and/or in the transfer film 1, two or more layers of the one or more forming elements 40 are preferably applied overlapping one another and/or the one or more forming elements 40 are applied at least partially by means of 3D printing. It is hereby made possible for example to increase the height of the one or more forming elements 40 starting from the carrier ply 3. It is further possible that several layers of the one or more forming elements 40 are or have been applied by means of the same printing method and/or several layers are or have been applied by means of different printing methods.

It is in particular possible that at least two different printing methods are used for the application of the one or more forming elements 40. It is for example possible to apply one or more first layers of the one or more forming elements 40 by means of a printing method which is preferably not a digital printing method, for example by means of screen printing. A large, non-individualized surface area of the one or more forming elements is in particular applied using it. It is further possible that at least one layer of the one or more forming elements 40 applied last in step c) is applied using a digital printing method, preferably an inkjet printing method, preferably a UV inkjet printing method. In particular, at least one layer of the one or more forming elements 40, which forms an outer surface of the transfer film 1, contains or consists of a digital printing ink, preferably an inkjet printing ink, preferably a UV inkjet printing ink. A spatial separation of applications of different layers can herewith be achieved for example in step c). An individualization, preferably in the form of small surface areas, is hereby made possible for example, in particular before and/or after transport, storage and in particular shortly before and/or at the location of the production of the plastic injection-molded article 10.

It is further possible that a molding 41 with various heights is or has been produced in the plastic injection-molded article 10 by means of various heights of the one or more forming elements 40. This is achieved in particular through the use of suitable settings in the digital printing method, preferably through the number of overlapping printing inks and/or layers of a forming element, the individual ink drop sizes, the UV curing parameters, the application weight of the individual printing inks and/or a combination thereof. It is thus possible that the transfer film 1 contains one or more forming elements 40 of various heights and/or that the plastic injection-molded article 10 contains a molding 41 with various heights and/or depths, in particular contains partial areas of the raised area 82 with various heights and/or partial areas of the recessed area 81 with various heights.

The layer thickness of a layer of the one or more forming elements 40 applied by means of digital printing preferably lies a range of from 0.5 µm to 50 µm, in particular in a range of from 1 µm to 25 µm.

It is further possible that at least one forming element of the one or more forming elements 40 printed by means of digital printing has a layer thickness of from 1 µm to 200 µm. The layer thickness of at least one forming element of the one or more forming elements 40 in particular lies in a range of from 1 µm to 200 µm. Here, several, preferably all, layers of the at least one forming element are preferably applied by means of digital printing and in particular overlapping.

It is further possible that a layer of the one or more forming elements 40 printed by means of gravure printing has a layer thickness in a range of from 1 µm to 25 µm and/or that a layer of the one or more forming elements 40 printed by means of screen printing has a layer thickness in a range of from 1 µm to 100 µm.

It is further possible that the method contains the following step:

irradiating the one or more forming elements 40, in particular by means of UV irradiation, wherein one or more irradiation steps are carried out, which are preferably carried out after step c) and/or during step c), in particular before to at least one layer of the one or more forming elements is applied, overlapping, to at least one other layer of the two or more layers of the one or more forming elements. It is conceivable that overlapping layers are cured in between so that they do not run, for example, and e.g. a higher height-to-width ratio can thereby be achieved.

With respect to the composition of the one or more forming elements 40, reference is made in particular to the above statements.

In particular, during the back-injection molding of the transfer film 1 with the injection-molding compound 5 of step x3), a recessed area 81 is produced in the transfer ply 2, wherein the recessed area 81 is preferably formed by the molding 41. The recessed area 81 thus in particular contains a positive image of the one or more forming elements 40. It is further possible that, during the back-injection molding of the transfer film 1 with the injection-molding compound 5 of step x3), a raised area 82 is formed in the transfer ply 2. The raised area 82 thus in particular contains a negative image of the one or more forming elements 40. The raised area 82 and/or the recessed area 81 can be a continuous area or alternatively or additionally comprise one or more partial areas separate from one another. It is thus possible that the raised area 82, the recessed area 81 and/or the molding 41 form one or more motifs, which are in particular complementary to the one or more motifs of the one or more forming elements 40. The raised area 82 is in particular arranged where there is no forming element 40 present in the transfer film 1 and/or in which the transfer ply 3 deforms in the direction of the carrier ply 3 during the back-injection molding with the injection-molding compound 5. The recessed area 81 is in particular arranged where the one or more forming elements 40 are present in the transfer film 1 and/or in which the transfer ply 2 does not move, or substantially does not move, in the direction of the carrier ply 3 during the back-injection molding with the injection-molding compound 5.

It is possible that the raised area 82 and/or the recessed area 81 has a minimum line width and/or a minimum dot size in a range of from 0.025 mm to 0.1 mm, in particular when the one or more forming elements 40 have been or are applied by means of UV digital printing. By way of example, for the case where the recessed area 81 has a circular footprint and the sectional plane lies in the center thereof, in FIGS. 3b and 3c the dot size would be the distance from the upper to the lower dashed marking of the area 81. By way of example, for the case where the recessed area 81 is a line, which in FIGS. 3b and 3c spreads out in the viewing direction, the line width would preferably be the distance from the upper to the lower dashed marking of the area 81 of the sectional plane shown.

It is possible in particular that the recessed area 81 has a minimum line width and/or a minimum dot size of more than 0.025 mm and/or the raised area 82 has a minimum line width and/or a minimum dot size of more than 0.040 mm, in particular for the case where the one or more forming elements 40 have been or are applied by means of digital printing. It is also possible that the recessed area 81 has a minimum line width and/or a minimum dot size of more than 0.075 mm and/or the raised area 82 has a minimum line width and/or a minimum dot size of more than 0.12 mm, in particular for the case where the one or more forming elements 40 have been or are applied by means of gravure printing. It is further possible that the recessed area 81 has a minimum line width and/or a minimum dot size of more than 0.10 mm and/or the raised area 82 has a minimum line width and/or a minimum dot size of more than 0.15 mm, in particular for the case where the one or more forming elements 40 have been or are applied by means of screen printing.

For example, in the case of a produced haptic surface area of approximately 0.5 cm×0.01 cm, no tangible difference, and/or no difference that can be felt by the fingertips, between positive and negative forming element 40 can thus be ascertained. By a positive forming element 40 is meant an isolated forming element 40 which produces a recessed area 81 in the carrier ply 3 after the back-injection molding, when the cross section is viewed. Such a positive forming element 40 is represented in FIGS. 10a and 10b. Wherein FIG. 10a shows the positive forming element 40 before the back-injection molding and FIG. 10b shows the positive forming element 40 after the back-injection molding. By a negative forming element 40 is meant one or more whole-surface forming elements which produce a raised area 82 of the carrier ply 3 after the back-injection molding, when the cross section is viewed. Such a negative forming element 40 is represented in FIGS. 11a and 11b. Wherein FIG. 11a shows the negative forming element before the back-injection molding and FIG. 11b shows the negative forming element after the back-injection molding. As represented in FIGS. 10b and 11b, after the back-injection molding the forming element 40 is preferably flush or almost flush with the surface of the carrier ply, with the result that no tangible difference, and/or no difference that can be felt by the fingertips, between positive and negative forming element 40 can be ascertained.

In particular, the one or more forming elements 40 have a higher dimensional stability than the carrier ply 3 and/or the transfer ply 2, preferably than at least one layer of the transfer ply 2. By a higher dimensional stability is meant in particular a higher resistance to deformation during the back-injection molding 203 of the transfer film 1 with the injection-molding compound 5.

The one or more forming elements 40 are preferably mechanically stable and/or have a mechanical stability, in particular in the case of a back-injection molding with the injection-molding compound 5, preferably in an IMD injection-molding process, thus in particular in step x3). By the mechanical stability is meant here in particular the stability of the one or more forming elements 40 with respect to the load acting through the injection-molding compound 5, in particular during the back-injection molding 203 of the transfer film 1 with the injection-molding compound 5. In other words, the one or more forming elements 40 are preferably sufficiently hard and produce a sufficiently strong connection to the carrier film 3, in order to withstand in particular the high pressure which is generated during the back-injection molding 203. For this purpose, the one or more forming elements 40 preferably have a glass transition temperature of more than 200° C. It is further possible that the one or more forming elements 40 have a substantially constant compressive strength up to a temperature of 200° C. In particular the deformation of the transfer ply 3 when the transfer film 1 is exposed to pressure and/or heat, in particular during the back-injection molding of the transfer film 1 with the injection-molding compound, is hereby guaranteed and in particular a high edge-sharpness of the molding 41 is made possible.

It is possible that the mechanical stability is determined with reference to the difference in height when comparing the height of the one or more forming elements 40 before and after the back-injection molding 203 of the transfer film 1 with the injection-molding compound 5, wherein the height of the one or more forming elements 40 after the back-injection molding 203 of the transfer film 1 with the injection-molding compound 5 corresponds to the height of the molding 41 of the plastic injection-molded article 10.

The molding 41 preferably has a height in a range of from 90% to 100% of the height of the one or more forming elements 40 of the transfer film 1 before the back-injection molding 203 with the injection-molding compound 5. It is possible that the temperatures arising in the injection mold during the back-injection molding, in particular the temperature of the injection-molding compound, lie or lies in a range of from 150° C. to 500° C., in particular in a range of from 200° C. to 300° C. It is possible that the pressures arising in the injection mold during the back-injection molding, in particular the internal pressure of the injection mold, lie or lies in a range of from 300 bar to 1000 bar, in particular in a range of from 400 bar to 800 bar.

It is possible for example that the molding 41 after the back-injection molding 203 of the injection-molding compound 5 has a height of 90% of the height of the one or more forming elements 40 before the back-injection molding 203 of the injection-molding compound 5, in particular for the case where the carrier ply 3 has a layer thickness of 50 μm and preferably consists of PET. It is also possible that the molding 41 after the back-injection molding of the injection-molding compound has a height of 100% of the height of the one or more forming elements 40 before the back-injection molding of the transfer film 1 with the injection-molding compound 5, in particular for the case where the carrier ply 3 has a layer thickness of 75 µm and preferably consists of PET. In particular in the case of a layer thickness of the carrier ply 3, which preferably consists of PET, of at least 75 µm the height of the one or more forming elements 40 is maintained or is just as high before the back-injection molding 203 of the transfer film 1 with the injection-molding compound 5 as after the back-injection molding.

The height of the molding 41 is preferably determined on the plastic injection-molded article 10 in particular with reference to the difference in height between an outer surface of the transfer ply 2 in the recessed area 81 and a neighboring outer surface of the transfer ply 2 in a raised area 82. The height of the one or more forming elements 40 is in particular measured before the back-injection molding 203 of the transfer film 1. The measurement of the height of the molding 41 and/or of the one or more forming elements 40 and/or the line width and/or the dot size is in particular carried out by means of scanning electron microscope (SEM).

The height of the molding 41 of the plastic injection-molded article 10 which is achieved in particular in the method for producing the plastic injection-molded article 10 preferably lies in a range of from 1 µm to 200 µm.

Preferably, the one or more forming elements 40 have been, in the transfer film 1, or are, in step c), arranged register-accurately with respect to the decorative ply 21 in at least two different directions. In FIGS. 3a, 3b and 3c, one direction points, for example, along the viewing direction and the other along a vertical line. It is hereby possible for example, in the method for producing the transfer film 1, to apply the one or more forming elements 40 register-accurately with respect to the decorative ply 21 both in the running direction of the carrier ply 3 and transverse to the running direction of the carrier ply 3, in particular to apply them register-accurately with respect to decorative elements separate from one another, for example separate motifs, of the decorative ply 21. It is in particular possible that at least one forming element of the one or more forming elements 40 has been or is arranged register-accurately in each case with respect to at least one decorative element of one or more decorative elements, wherein the at least one decorative element preferably forms a separate motif. A separate motif is in particular not an endless motif and/or has visible boundary lines in the transfer film 1 and/or the plastic injection-molded article 10 in the two different directions. Thus, it is further possible that the molding 41 or at least a partial area of the molding 41 has been or is arranged register-accurately with respect to at least one decorative element of one or more decorative elements.

The register tolerance between the one or more forming elements 40 and the decorative ply preferably lies in a range of from 0.05 mm to 1.0 mm, preferably in a range of from 0.05 mm to 0.2 mm. The register tolerance between the one or more forming elements 40 and the decorative ply 21 is in particular at most 1.0 mm, preferably at most 0.2 mm. It is thus also possible that the register tolerance between the molding 41 and the decorative ply 21 preferably lies in a range of from 0.05 mm to 1.0 mm, preferably in a range of from 0.05 mm to 0.2 mm, and/or is at most 1.0 mm, preferably at most 0.2 mm.

A register tolerance in the range of from 0.05 mm to 0.2 mm is in particular achieved when the one or more forming elements 40 are applied by means of a digital printing method, preferably by means of inkjet printing, preferably UV inkjet printing. If the one or more forming elements 40 are applied by means of screen printing, a register tolerance in the range of from 0.2 mm to 1.0 mm is in particular possible.

FIG. 3c shows the plastic injection-molded article 10 shown in FIG. 3b except that the plastic injection-molded article 10 further has a functional component part 6. The functional component part 6 is preferably arranged register-accurately with respect to the molding 61 and register-accurately with respect to the decorative ply 21.

It is further possible that the transfer film 1 and/or the plastic injection-molded article 10 has a viewing area 71 and/or a masking area 72. The viewing area 71 is in particular provided so that, in the plastic injection-molded article 10 on the side of the injection-molding compound 5 lying opposite the transfer ply 2, further components can be arranged visible at least at times through the transfer ply 2. The masking area 72 is in particular provided so that the further components arranged in the plastic injection-molded article 10 on the side of the injection-molding compound 5 lying opposite the transfer ply 2 are concealed from view through the transfer ply 2 in the masking area. For this, the method preferably comprises the following step, in particular before and/or after step c):

b1) preparing and/or producing a masking area 72 and/or a viewing area 71 in the transfer ply 3.

The viewing area 71 preferably has a transmittance which is higher in particular than the transmittance of the masking area 72, is preferably higher than the transmittance of the masking area by a value of at least 10% and/or in a range of from 10% to 100%. The viewing area 71 preferably has a transmittance of more than 50%, in particular more than 75%. The masking area preferably has a transmittance of less than 50%, in particular less than 20%, preferably less than 5%. The transmittance relates in particular to electromagnetic waves, preferably with wavelengths visible to the human eye. In the viewing area, the transfer ply 3 is preferably transparent for light which is visible to the human eye. In the masking area 72, the transfer ply 3 is in particular opaque for light which is visible to the human eye.

It is also possible that the viewing area 71 is produced in the transfer ply 3, in particular in a mask layer, in or after step b1).

As is shown by way of example in FIG. 3c, the plastic injection-molded article 10 has been provided in particular with one or more functional component parts 6 and/or is provided with one or more functional component parts 6 during or after the back-injection molding 203 of the transfer film 1 with the injection-molding compound 5. Here, the one or more functional component parts 6 have been or are in particular arranged on the side of the injection-molding compound 5 lying opposite the transfer ply 2. The one or more functional component parts preferably have at least one of the following components: one or more sensors, in particular one or more touch sensors, one or more illuminants, in particular one or more displays, one or more LEDs, one or more light-conducting component parts, one or more printed circuit boards and/or combinations thereof.

By means of the one or more illuminants, a backlighting is integrated into the plastic injection-molded article 10, for example. It is possible that a backlighting is prepared as a separate component part comprising one or more LEDs on a printed circuit board for this purpose, wherein the one or more LEDs are preferably connected to the printed circuit board via a soldered connection. The one or more illuminants, in particular in the form of LEDs, preferably the backlighting, preferably have been or are arranged in a particularly register-accurate overlapping with the viewing area 71, preferably directly behind and/or in the viewing area 71. It is further possible that the plastic injection-molded article 10 contains one or more diffuser layers and/or one or more light-guide layers. The one or more illuminants, in particular in the form of LEDs, preferably in the form of the backlighting, preferably are or have been integrated into the plastic injection-molded article by means of gluing, screwing, ultrasonic welding, soldering, clamping, heat staking, infrared welding . . . .

The one or more illuminants, preferably one or more LEDs, have been, in the plastic injection-molded article 10, or are, in particular before the back-injection molding 203 of the transfer film 1 in step x3), arranged preferably on the side of the transfer ply 2 facing away from the carrier ply 3 and/or are connected to the transfer ply 2 during the back-injection molding 203 and optionally to the transfer ply 2 via the injection-molding compound 5. It is further possible that the one or more illuminants, preferably the one or more LEDs, are or have been introduced into the plastic injection-molded article, in particular after the back-injection molding with the plastic compound of step x3), in particular wherein the illuminants are or have been introduced into the injection-molding compound and/or connected to the injection-molding compound.

It is possible that the one or more sensors, in particular touch sensors, are or have been arranged on or within the transfer film 1 before the transfer film 1 is back-injection molded with the injection-molding compound 5. It is further possible that the one or more sensors, in particular the one or more touch sensors, are or have been arranged on the side of the transfer ply 2 facing away from the carrier ply 3 preferably before the back-injection molding 203 of the transfer film 1 in step x3) and are or have been connected to the transfer ply 2 during the back-injection molding 203 and optionally to the transfer ply 3 via the injection-molding compound 5.

It is possible that at least one sensor, in particular at least one touch sensor, of the one or more sensors is preferably not part of the transfer film 1 and/or is not integrated into the plastic injection-molded article 10 as part of the transfer film 1. It is further possible that this at least one sensor, in particular touch sensor, is applied subsequently, preferably to the side of the injection-molding compound 5 lying opposite the transfer ply 2. It is possible here that the at least one sensor is or has been glued, preferably extensively, into an optional open area formed by the geometry of the component part with the injection-molding compound 5.

It is further possible that the one or more touch sensors, after the back-injection molding 203 with the injection-molding compound 5 of step x3), are introduced into the plastic injection-molded article 10, in particular are connected to the injection-molding compound 5 and/or fastened to the injection-molding compound 5.

It is further possible that the one or more sensors, in particular the one or more touch sensors, are introduced by means of gluing, laminating, In-Mold Labeling (=IML) and/or Functional Foil Bonding (=FFB). With respect to the methods of laminating, IML and FFB, reference is made in particular to the further statements above.

The one or more functional component parts 6 are preferably attached register-accurately to the molding 41 and to the decorative ply 21.

FIG. 4*a* shows, schematically, a top view onto a transfer film 1 and/or onto a plastic injection-molded article 10 coated with the transfer ply 2 of the transfer film 1. FIG. 4*b* and FIG. 4*c* show schematic representations on a sectional plane which is shown in FIG. 4*a* with the section line A-A through the transfer film 1 or through the plastic injection-molded article 10. Here it is possible in particular that the transfer film 1 is the transfer film 1 described in relation to FIG. 3 and/or is produced as is described in relation to FIG. 1 or FIG. 3. It is further possible that the plastic injection-molded article 10 is the plastic injection-molded article 10 described in relation to FIG. 2 and/or is produced as is described in relation to FIG. 2 or to FIG. 3. Here, the transfer ply 2 further has a primer layer 23, a mask layer 22, a protective layer 24 as well as a separating layer 8.

In particular, the separating layer 8, the protective layer 24, the decorative ply 21, the mask layer 22 and the primer layer 23 are preferably applied to the carrier ply 3 one after another in the specified order, in order to obtain a transfer film 1 preferably as shown in FIG. 4*b*. In a subsequent step, the plastic injection-molded article 10 can be produced by means of back-injection molding 203 of the transfer film 1.

As is shown in FIG. 4*b*, the primer layer 23 in particular forms an outer surface of the transfer ply 2 facing away from the carrier ply 3. As is shown in FIG. 4*c*, in the plastic injection-molded article 10 the primer layer 23 forms an outer surface of the transfer ply 2 facing the injection-molding compound 5. The primer layer 23 is in particular an adhesive layer and/or an adhesion-promoter layer. With respect to the materials of the primer layer 23, reference is made in particular to the above statements.

A protective layer 24 is further arranged on the side of the transfer ply 2 facing the carrier ply 3. As is shown in FIG. 4*b*, the protective layer 24 preferably forms a surface of the transfer ply 2 facing the carrier ply 3 of the transfer film 1 or an exposed surface of the transfer ply 2 after the detachment of the carrier ply 3, as can be seen in particular in FIG. 4*c*. It is possible here that the protective layer 24 is provided at least in areas and/or over the whole surface in the transfer ply. The protective layer 24 is in particular a protective varnish layer. The protective layer preferably has a layer thickness in a range of from 1 µm to 50 µm. With respect to the composition of the protective layer 24, reference is made in particular to the above statements regarding the composition of the first protective layer. The protective layer 24, in particular in the form of the protective varnish layer, preferably has been or is applied by means of gravure printing and/or slot casting, preferably applied to the carrier ply 3 and an optional separating layer 8.

In FIG. 4*a*, the viewing area 71 and the recessed area 81 are depicted, for example, in the shape of a telephone symbol and preferably comprise all parts of the transfer film 1 or of the plastic injection-molded article 10 overlapping the telephone symbol. Here, the minimum line width is preferably the smallest distance between two opposite points of the boundary line of the recessed area 81, in particular of the telephone symbol.

Through a register-accurate arrangement between the one or more forming elements 40 and the mask layer 22 it is possible that the molding 41, in particular in the shape of the recessed area 81, is arranged register-accurately with respect to the mask layer 22 and/or in particular register-accurately in the viewing area 71, and in particular with respect to the telephone symbol. It is alternatively conceivable, for example, that the one or more forming elements 40 are arranged in the masking area 82, with the result that the raised area 82 is arranged register-accurately in the viewing area 71.

In the example shown here, the transmittance of the transfer ply 2, in particular in the visible wavelength range, is or has been lowered through the mask layer 22, which results in the viewing area 71 and the masking area 72 of the transfer ply 3. The mask layer 22 is preferably arranged on a side of the decorative ply 21 facing away from the carrier ply 2 and/or arranged a side of the decorative ply 21 facing the injection-molding compound 5. It is possible in particular that the mask layer 22 is used as a backlighting mask, for example when the plastic injection-molded article 10 is equipped with functional component parts 6, as is shown by way of example in FIG. 3c, wherein the functional component parts 6 in particular comprise one or more illuminants, in particular one or more LEDs and/or one or more displays.

The mask layer 22 preferably is or has been applied by means of a digital printing method, in particular by means of inkjet printing, preferably UV inkjet printing, gravure printing and/or screen printing. The mask layer has in particular a layer thickness in a range of from 1 µm to 100 µm. A layer thickness of the mask layer in a range of from 1 µm to 50 µm is possible in particular when the mask layer has been applied by means of the digital printing method, preferably inkjet printing, preferably UV inkjet printing. A layer thickness of the mask layer 22 in a range of from 1 µm to 30 µm is preferably possible when the mask layer 22 has been applied by means of gravure printing. A layer thickness of the mask layer 22 in a range of from 5 µm to 100 µm is preferably possible when the mask layer 22 has been applied by means of screen printing.

With respect to further properties of the mask layer, reference is made in particular to the above statements.

In an advantageous embodiment of the plastic injection-molded article 10 and/or of the method for the production thereof, the molding 41 has been and/or is in particular arranged in such a way that the molding 41 does not impair the transillumination properties of the transfer ply 3, in particular the decorative ply 21 and/or the mask layer 22, and/or the injection-molding compound 5.

For example, the molding 41 has substantially no influence on the wavelength, in particular the color, and/or the scattering of a radiation being transmitted through the viewing area 71 of the transfer ply 3, in particular of the light being transmitted through the viewing area 71 of the transfer ply 3 that is visible to the human eye. In particular, the transfer ply 3, in particular the protective layer 24 of the transfer ply 4, can be transilluminated uniformly in the viewing area 71. As can be seen in FIG. 4c for example, the molding 41 preferably does not comprise any layer thickness changes in the viewing area 71. This can be achieved, for example, if the viewing area 71 is overlapped over the whole surface by the molding 41 and in particular by the recessed area 81. The one or more forming elements 40 of the transfer film 1 have a constant layer thickness preferably at least in the viewing area 71 for this purpose.

Advantageously, the one or more forming elements 40 and the viewing area 71 and/or the masking area 72, in particular the mask layer 22, are, in the method for producing the transfer film 1, in particular during step c) and/or during step b1), and/or in the method for producing the plastic injection-molded article 10, or have been, in the transfer film 1 and/or in the plastic injection-molded article 10, arranged register-accurately with respect to one another. In the method for producing the plastic injection-molded article 10 and/or in the plastic injection-molded article 10, the molding 41 and the viewing area 71 and/or the masking area 72, in particular the mask layer 22, are or have been correspondingly also arranged register-accurately with respect to one another.

The register tolerance between the one or more forming elements 40 and the viewing area 71 and/or the masking area 72, in particular between the one or more forming elements 40 and the mask layer 22, preferably lies in a range of from 0.05 mm to 1.0 mm, preferably in a range of from 0.05 mm to 0.2 mm. The register tolerance between the one or more forming elements 40 and the viewing area 71 and/or the masking area 72, in particular between the one or more forming elements 40 and the mask layer 22, is in particular at most 1.0 mm, preferably at most 0.2 mm. The register tolerance in the range of from 0.05 mm to 0.2 mm is achieved, for example, when the one or more forming elements 40 are applied by means of a digital printing method, preferably by means of inkjet printing, preferably UV inkjet printing. If the one or more forming elements 40 are applied by means of screen printing, the register tolerance in the range of from 0.2 mm to 1.0 mm is in particular possible.

In particular, as the molding 41 is formed by the forming elements 40, the above-named limits for the register tolerance also apply to the register tolerance between the molding 41 and the mask layer 22 in the plastic injection-molded article 10 and during the production process thereof.

The register tolerance between the decorative ply 21 and the viewing area 71 and/or the masking area 72, in particular between the decorative ply 21 and the mask layer 22, preferably lies in a range of from 0.1 mm to 0.4 mm and/or is at most 0.4 mm. The register tolerance in the range of from 0.1 mm to 0.4 mm is in particular achieved when the mask layer 22 has been or is applied, preferably in-line, by means of a gravure printing method.

It is hereby in particular guaranteed that the plastic injection-molded article 10 has a viewing area 71 and/or a masking area 72, in particular formed by means of the mask layer 22, register-accurate with respect to the molding 41 and to the decorative ply 21. Thus it is possible for example to backlight the viewing area 71 and to make an interaction by means of further functional component parts, such as touch sensors, possible, which can advantageously be carried out particularly easily, intuitively and/or precisely. In particular, the optical appearance is also particularly striking.

It is further possible that the maximum register tolerance between the one or more forming elements 40 and/or the decorative ply 21 and/or the viewing area 71 and/or the masking area 72, in particular the mask layer 22, lies in a range of from 0.15 mm to 0.6 mm. Here, the maximum register tolerance in particular indicates the maximum deviation from a target value of the position of two of the named components relative to one another, for example between a forming element and the decorative ply 21. In particular, as the molding 41 is formed by the forming elements 40, the limits for the register tolerance also apply to the register tolerance between the molding 41 and the decorative ply 21 and/or the viewing area and/or the masking area, in particular the mask layer 22, in the plastic injection-molded article 10.

The plastic injection-molded article 10 can in particular have the one or more functional component parts 6 described in relation to FIG. 3c or be provided so that the functional component parts 6 are applied in a later step.

The one or more functional component parts 6 preferably are or have been attached register-accurately with respect to the one or more forming elements 40, to the molding 41, to the decorative ply 21 and to the mask layer 22 and/or to the viewing area 71. It is possible here that the register tolerance between the one or more functional component parts 6 and the molding 41, the decorative ply 21, the viewing area 71 and/or the mask layer 22 is at most 0.3 mm, in particular at most 0.2 mm. Here, the one or more component parts 6 comprise, for example, at least one touch sensor, which is arranged register-accurately with respect to the molding 41 and in the process deviates by at most 0.2 mm from a target position in relation to a position of the decorative ply 21 and the molding 41.

It is also conceivable that the following step is carried out before and/or after step x3):

b2) producing a viewing area 71 in the transfer ply 2, wherein the viewing area 71 has been or is arranged register-accurately with respect to the one or more forming elements 40, the molding 41 and/or the decorative ply 21, and wherein the mask layer 22 is partially removed in the viewing area 71 and/or the transmittance of the transfer ply 2 is increased in the viewing area 71. Here, the mask layer 22 is preferably first also deposited in an area which, after a processing of the mask layer 22, forms the viewing area 71 in this area. In particular, the viewing area 71 is produced here by means of a laser. It is further conceivable that the viewing area 71 is produced by means of a laser after step x3) has been carried out, in particular wherein the transfer film 1 has been back-injection molded with the injection-molding compound 5 and after the injection-molding compound 5 has hardened.

The viewing area 71 is or has been formed in particular by one or more voids and/or open areas, in particular in the mask layer 22. It is further possible that the viewing area 71 is arranged congruent with the one or more forming elements 40 at least in partial areas and/or that the masking area 72 does not overlap the one or more forming elements 40. For example, it is possible that the viewing area 71 is or has been formed by one or more voids and/or open areas in an opaque layer, wherein the opaque layer for example forms the masking area 72 or a part thereof and/or the mask layer 22. Here, in addition to the voids and/or open areas, the viewing area 71 preferably also comprises further layers, such as for example at least the decorative ply 21.

In particular also in the plastic injection-molded article 10 or during the method for the production thereof it is possible that the viewing area 71 has been or is formed by one or more voids and/or open areas, in particular in the mask layer 22. It is hereby possible that the viewing area 71 is arranged congruent with the molding 41 and/or the recessed area 81 of the transfer ply 3 at least in partial areas and/or that the masking area 72 does not overlap the molding 41. It is conceivable here that the one or more voids and/or open areas are at least partially filled with the transfer ply 2. It is in particular possible that, during the back-injection molding 203 of the transfer film 1 with the injection-molding compound 5 in step x3), the transfer ply 2 is deformed in such a way that the one or more open areas and/or voids are at least partially filled with the transfer ply 2. In particular the edge sharpness of the molding 41 and the register accuracy can hereby be improved.

For the mask layer 22 and/or the decorative ply 21, corresponding registration marks preferably are or have been applied, preferably during the application of each layer of the mask layer 22 and/or of the decorative ply 21. Such registration marks are for example crosses, circles and/or triangles. The registration marks are preferably applied in each case on at least one outside and/or one edge of the transfer film 1, with the result that they can be read, in particular by means of at least one sensor. It is also possible that at least parts of one or more motifs of the decorative ply 21 and/or of the mask layer 22 are used as registration marks. In particular in a subsequent step, the one or more forming elements 40 and preferably registration marks associated with the one or more forming elements 40 are applied to the side of the carrier ply 3 lying opposite the transfer ply 2. For carrying out step c) and/or in step c), for example the position in which the one or more forming elements 40 are applied to the carrier ply 3 is set in dependence on the position of the registration marks allocated to the decorative ply 21 and to the mask layer 22.

It is further possible that, during the provision of the plastic injection-molded article 10 with the one or more functional component parts 6, the position of the one or more functional component parts 6 is or has been aligned with reference to the allocated registration marks of one or more layers of the decorative ply 21, the mask layer 22 and/or of the one or more forming elements 40.

In particular, a printed and/or sprayed sensor outline is used the application of one or more touch sensors. The printed and/or sprayed sensor outline is a marking printed and/or sprayed on the respective touch sensor. The printed and/or sprayed sensor outline preferably is or has been arranged with respect to one or more registration marks of the registration marks allocated to the one or more forming elements 40, the decorative ply 21, the viewing area 71 and/or the masking area 72, in particular the mask layer 22. In particular due to a corresponding mold design and registration marks, the respective touch sensor is connected register-accurately to the plastic injection-molded article 10 and the components thereof, preferably by means of the printed and/or sprayed sensor outline.

The transfer film 1 has an optional separating layer 8 between the carrier ply 3 and the transfer ply 2. Here, the transfer ply 2 is detachable from the carrier ply 3 in particular by means of the separating layer 8. In FIG. 4c, the carrier ply 3 is detached from the transfer ply 2 with the forming element 40. The separating layer 8 preferably has a layer thickness in a range of from 1 μm to 5 μm. With respect to the materials of the separating layer 8, reference is made in particular to the above statements. The separating layer 8 preferably has been or is applied by means of gravure printing and/or slot casting, preferably applied to the carrier ply. It is in particular possible that the method for producing the plastic injection-molded article 10 contains the following step: x4) separating the carrier ply 3 from the transfer ply 2 by means of and/or with the separating layer 8.

FIGS. 5a, 5b and 5c in particular show the transfer film described in relation to FIGS. 4a, 4b and 4c, the plastic injection-molded article described, and the method described, except that in particular the decorative elements 210 are further contained in the decorative ply 21. Here, they form the lettering "Phone", shown by way of example. It is possible here that each decorative element 210, in particular each letter, is arranged register-accurately with respect to the forming element 40 and to the viewing area 71 and correspondingly in particular also to the masking area 72 and the mask layer 22.

For this, for example before the application 103 of the one or more forming elements to the carrier ply of step c), the position of one or more decorative elements 210, which are allocated to one or more forming elements 40, is detected by means of at least one sensor. It is conceivable here that the decorative elements 210 themselves are used as registration marks. With respect to further properties of the decorative ply 21 and the decorative elements 210, reference is made in particular to the above statements.

Figure 6:
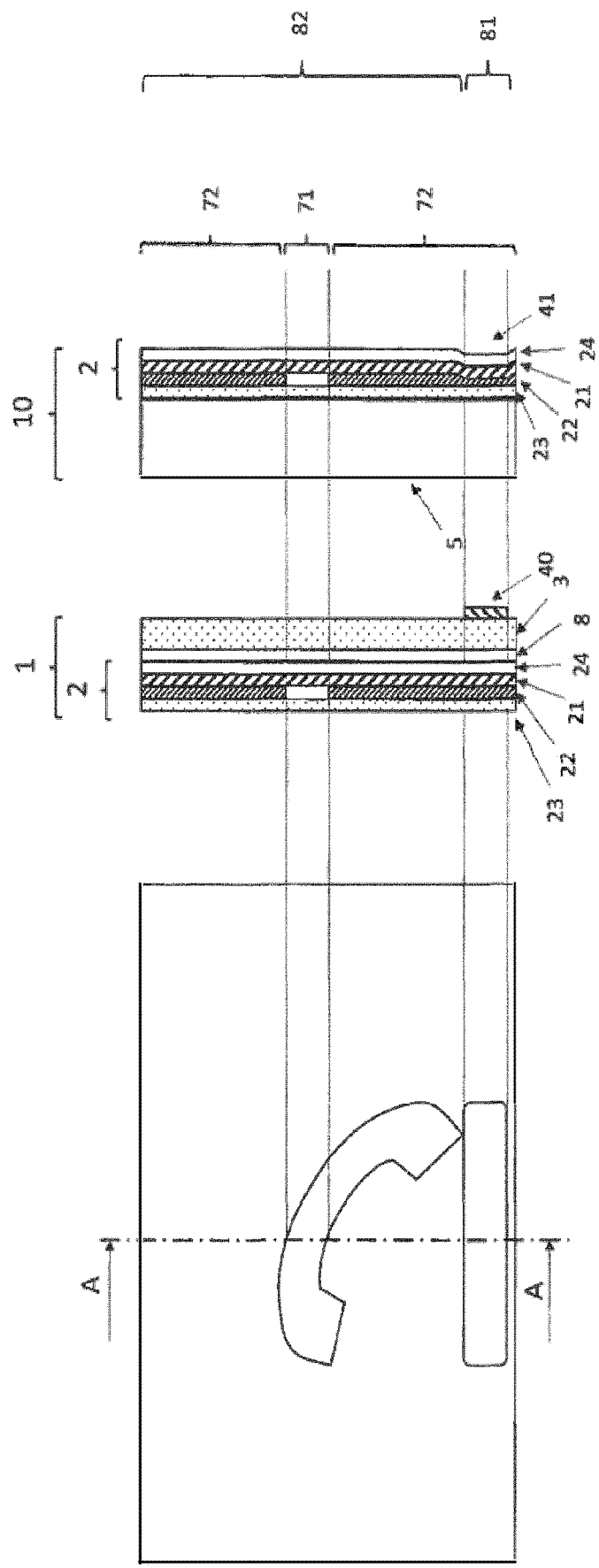

FIGS. 6a, 6b and 6c in particular show the transfer film 1 described in relation to FIGS. 4a, 4b and 4c, the plastic injection-molded article 10 described, and the method described, except that the one or more forming elements 40 are not arranged congruent with or overlapping the viewing area 71. Accordingly, here the recessed area 81 is not arranged in the viewing area 71, for example. A register-accurate arrangement of the forming element 40 with respect to the decorative ply 21 and in particular also with respect to the viewing area 71 is provided here. A precisely controllable and working operating element can thereby be integrated for example by means of items of haptic and visual information. For this, the plastic injection-molded article can be provided with functional component parts 6, such as illuminants and/or touch sensors, arranged register-accurately with respect to the molding 41.

Figure 7:
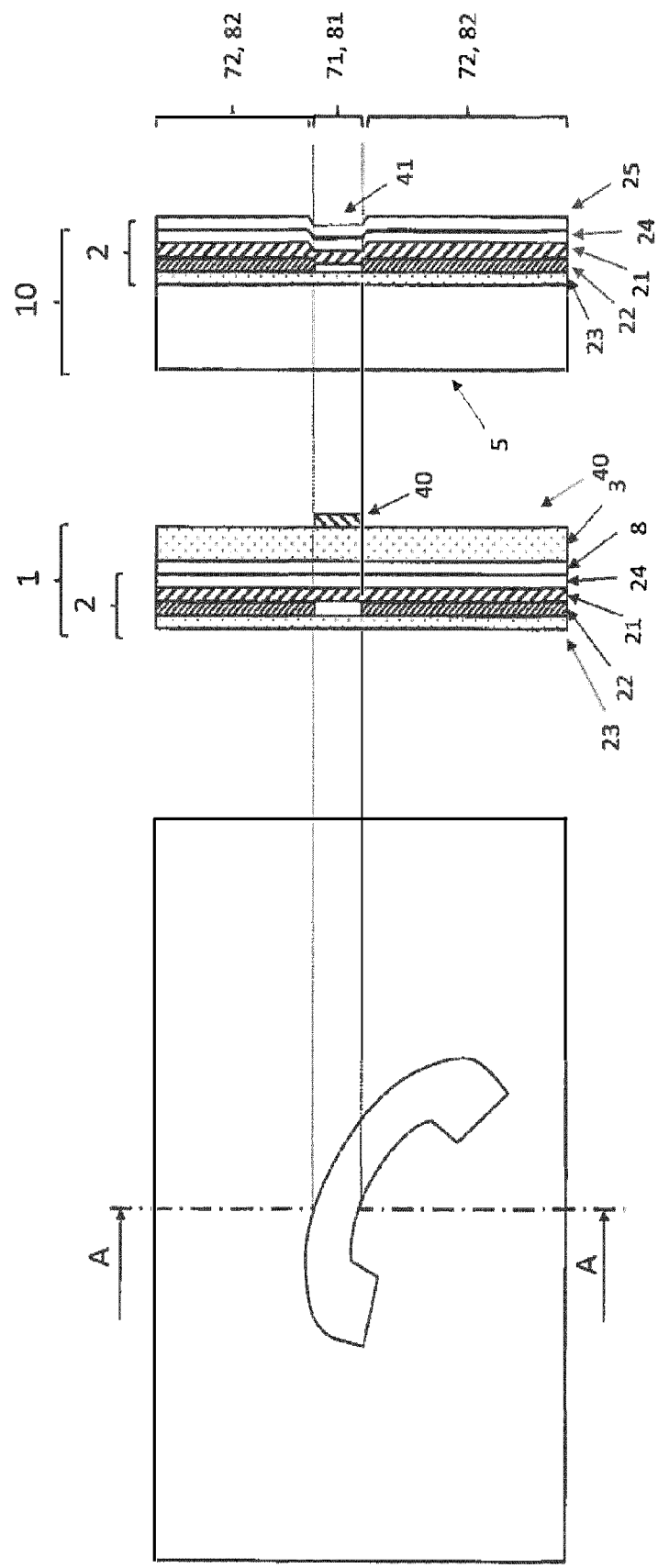

FIGS. 7a, 7b and 7c in particular show the transfer film described in relation to FIGS. 4a, 4b and 4c, the plastic injection-molded article described, and the method described, except that in FIG. 7c the protective layer 25 is further shown.

For this, the method for producing the plastic injection-molded article 10 further comprises the following step, which is carried out in particular after a separating of the carrier ply 3 from the transfer ply 2 of step x4):

flooding the transfer ply 2 and/or the injection-molding compound 5 at least in areas with a polyurethane-containing composition and/or with a polyurea-containing composition, in particular for the formation of at least one second protective layer 25. It is thus possible that on an outer surface, preferably on the transfer ply 2, the plastic injection-molded article 10 has at least one second protective layer 25 formed with a polyurethane-containing composition and/or with a polyurea-containing composition.

Here, at least the molding 41, a motif formed by the molding 41 and/or an area comprising the molding 41 has been or is preferably flooded. It is hereby achieved in particular that, although the plastic injection-molded article 10 looks haptic, it is haptically smooth when stroked. It is herewith possible to give the plastic injection-molded article 10 a particular optical depth effect at this location through the combination of the molding 41 and the polyurethane flooding or polyurea flooding. Signs of wear due, for example, to abrasion can in particular also be reduced.

Advantageously, the protective layer 24 and the protective layer 25 are matched to one another. With respect to the composition of the protective layers 24 and 25, reference is made in particular to the above statements in relation to the at least one first protective layer and the at least one second protective layer.

Figure 4:
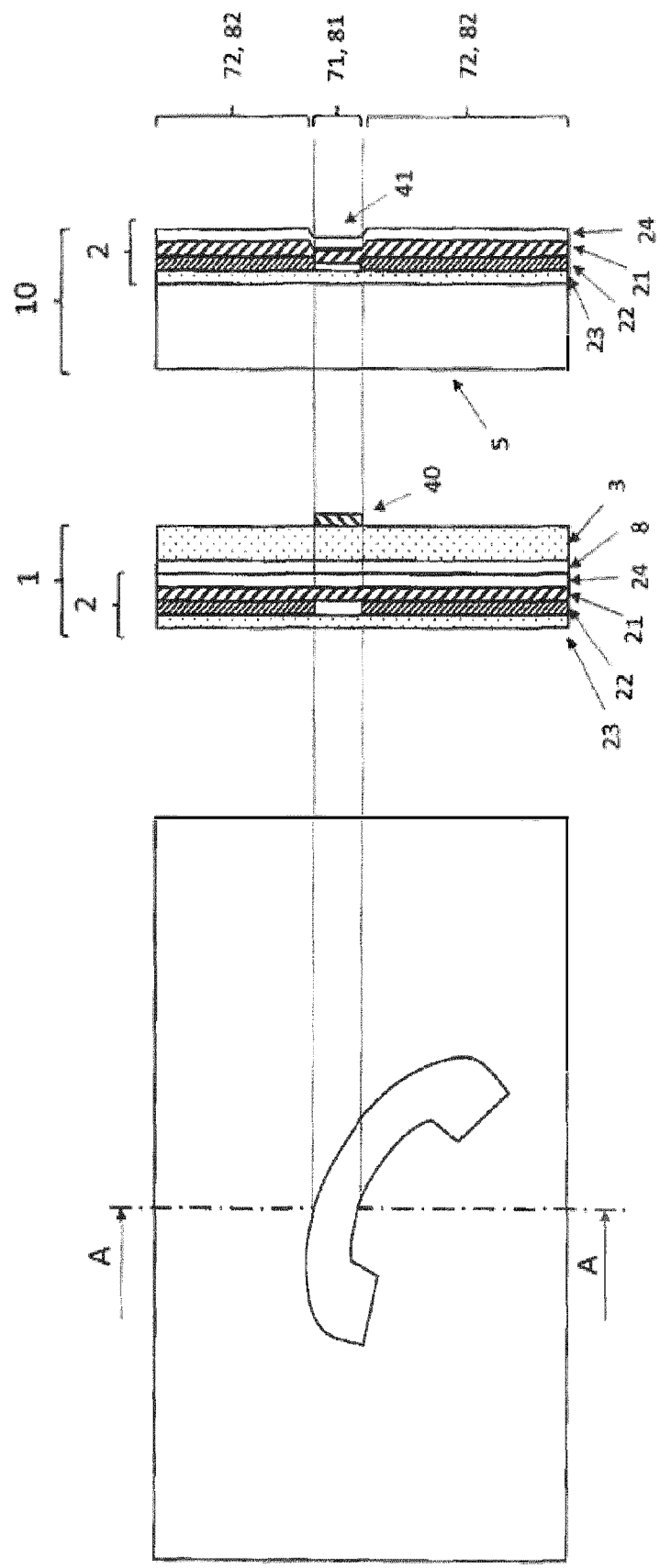
Figure 5:
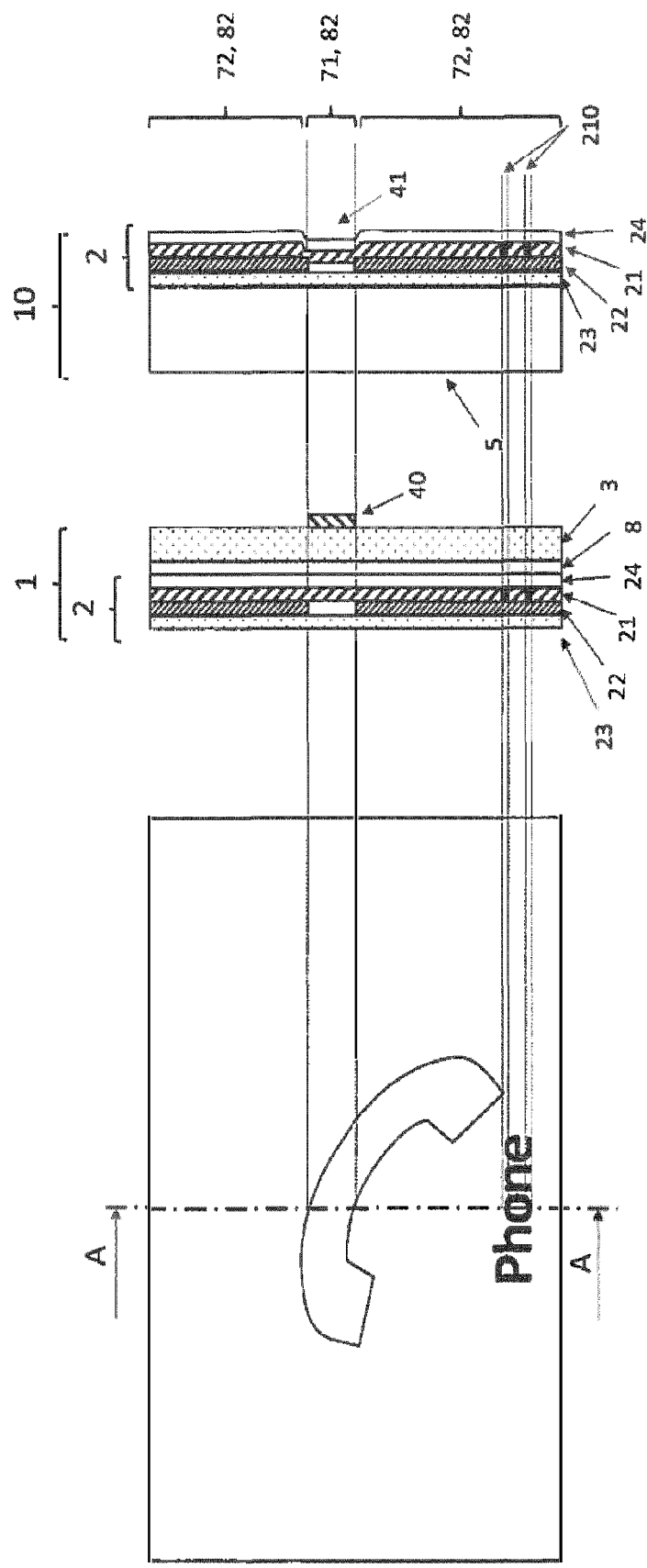
Figure 8:
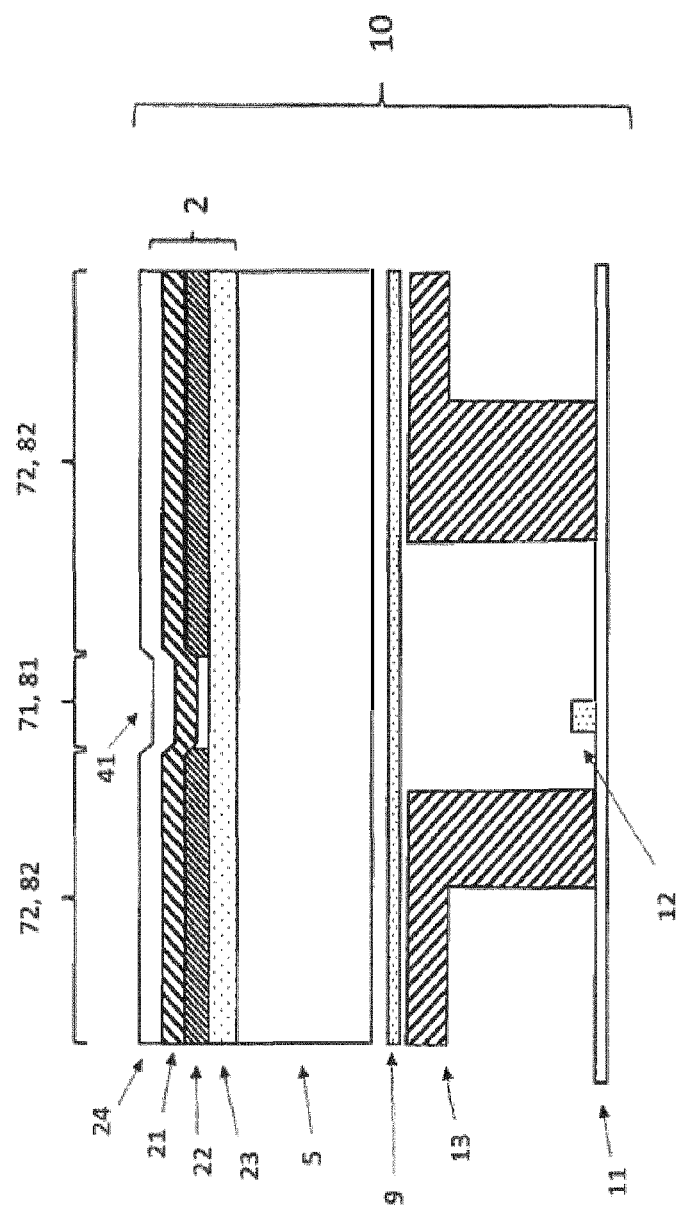

FIG. 8 shows a plastic injection-molded article 10 as described in relation to one of FIGS. 3, 4, 5 and/or 6. Here, the plastic injection-molded article 10 has a sensor 9, for example, which is in particular a touch sensor. Here, the sensor 9 is arranged on the injection-molding compound 5 on its side lying opposite the transfer ply 2. Here, the plastic injection-molded article 10 further contains a printed circuit board 11 with an LED 12 by way of example, which is connected to the sensor 9 via a light seal 13. The sensor 9 is preferably in direct contact with the surrounding components, preferably the injection-molding compound 5. In a preferred design variant it is provided that still further layers are provided between sensor 9 and the injection-molding compound 5 to improve the light seal. It is also possible that at least one adhesive layer, at least one diffuser layer and/or at least one light-guide layer are provided between sensor 9 and injection-molding compound 5.

The LED 12 is positioned register-accurately with respect to the viewing area 71 and the decorative ply 21 and the molding 41.

It is also possible that a protective layer 25 as described for example in relation to FIG. 7c has been or is arranged on the protective layer 24 in areas or over the whole surface.

FIG. 9 shows a further schematic design variant of a transfer film 1, in particular IMD transfer film 1, having a carrier ply 3, a transfer ply 2 comprising a decorative ply 21, wherein the transfer ply 2 is arranged on the carrier ply 3, and comprising one or more forming elements 40, wherein the one or more forming elements 40 are applied to the carrier ply 3 and register-accurately with respect to the decorative ply 21. It is preferably provided that a separating layer 8 is arranged between carrier ply 3 and the transfer ply 2. It is also possible that the transfer ply 2 has a separating layer 8. In addition to a decorative ply 21, in this embodiment example the transfer ply 2 has another protective layer, which is arranged between the decorative ply 21 and the separating layer 8, as well as a mask layer 22 and a primer 23, which are arranged underneath the decorative ply. Here, the mask layer 22 is provided in the masking areas 72 and is not provided in the viewing areas 71. The one or more forming elements are provided in the raised areas 82 and are not provided in the recessed areas 81.

LIST OF REFERENCE NUMBERS

1 transfer film
11 printed circuit board
12 LED
13 light seal
2 transfer ply
21 decorative ply
210 decorative elements
22 mask layer
23 primer
24 protective layer
25 protective layer
3 carrier ply
40 forming element
41 molding
5 injection-molding compound
6 functional component parts
71 viewing area
72 masking area
8 separating layer
81 recessed area
82 raised area
9 sensor

The invention claimed is:

1. A method for producing a plastic injection-molded article, which is coated with a transfer film, wherein the method comprises the following steps:
   x1) preparing a transfer film, wherein the transfer film has a carrier ply and has a transfer ply comprising a decorative ply, wherein the transfer ply has been or is arranged on the carrier ply,
   x2) preparing one or more forming elements on the carrier ply, wherein the one or more forming elements have a three-dimensional shape and have been or are applied register-accurately with respect to the decorative ply,
   x3) back-injection molding the transfer film with an injection-molding compound, wherein, through the action of the injection-molding compound on the transfer film, a molding of the three-dimensional shape of the one or more forming elements is introduced in the transfer ply register-accurately with respect to the decorative ply, wherein, during the back-injection molding of the transfer film with the injection-molding compound of step x3) a recessed area, is produced in the transfer ply and/or wherein during the back-injection molding of the transfer film with the injection-molding compound of step x3) a raised area is formed in the transfer ply, and wherein the raised area and/or the recessed area has a minimum line width and/or a minimum dot size in a range of from 0.025 mm to less than 0.1 mm.

2. A method for producing a plastic injection-molded article, which is coated with a transfer film, wherein the method comprises the following steps:
- x1) preparing a transfer film, wherein the transfer film has a carrier ply and has a transfer ply comprising a decorative ply, wherein the transfer ply has been or is arranged on the carrier ply,
- x2) preparing one or more forming elements on the carrier ply, wherein the one or more forming elements have a three-dimensional shape and have been or are applied register-accurately with respect to the decorative ply,
- x3) back-injection molding the transfer film with an injection-molding compound, wherein, through the action of the injection-molding compound on the transfer film, a molding of the three-dimensional shape of the one or more forming elements is introduced in the transfer ply register-accurately with respect to the decorative ply,
- wherein the following step is carried out before and/or after step x3):
- b2) producing a viewing area in the transfer ply, wherein the viewing area is arranged register-accurately with respect to the one or more forming elements, the molding and/or the decorative ply.

3. The method according to claim 2, wherein, during the back-injection molding of the transfer film with the injection-molding compound of step x3) a recessed area, is produced in the transfer ply and/or wherein during the back-injection molding of the transfer film with the injection-molding compound of step x3) a raised area is formed in the transfer ply.

4. The method according to claim 3, wherein the raised area and/or the recessed area has a minimum line width and/or a minimum dot size in a range of from 0.025 mm to less than 0.1 mm.

5. A method for producing a plastic injection-molded article, which is coated with a transfer film, wherein the method comprises the following steps:
- x1) preparing a transfer film, wherein the transfer film has a carrier ply and has a transfer ply comprising a decorative ply, wherein the transfer ply has been or is arranged on the carrier ply,
- x2) preparing one or more forming elements on the carrier ply, wherein the one or more forming elements have a three-dimensional shape and have been or are applied register-accurately with respect to the decorative ply,
- x3) back-injection molding the transfer film with an injection-molding compound, wherein, through the action of the injection-molding compound on the transfer film, a molding of the three-dimensional shape of the one or more forming elements is introduced in the transfer ply register-accurately with respect to the decorative ply,
- wherein, during or after the back-injection molding of the transfer film with the injection-molding compound, the plastic injection-molded article is provided with one or more functional component parts.

6. The method according to claim 5, wherein the one or more functional component parts have at least one of the following components: one or more sensors, one or more illuminants, one or more light-conducting component parts, one or more printed circuit boards and/or combinations thereof.

7. The method according to claim 6, wherein the one or more functional component parts, and/or the one or more illuminants, and the one or more forming elements, the molding, the decorative ply are arranged register-accurately with respect to one another.

8. The method according to claim 7, wherein the register tolerance between the one or more functional component parts and/or the one or more illuminants, and the one or more forming elements, the molding, the decorative ply is at most 0.3 mm.

9. A method for producing a plastic injection-molded article, which is coated with a transfer film, wherein the method comprises the following steps:
- x1) preparing a transfer film, wherein the transfer film has a carrier ply and has a transfer ply comprising a decorative ply, wherein the transfer ply has been or is arranged on the carrier ply,
- x2) preparing one or more forming elements on the carrier ply, wherein the one or more forming elements have a three-dimensional shape and have been or are applied register-accurately with respect to the decorative ply,
- x3) back-injection molding the transfer film with an injection-molding compound, wherein, through the action of the injection-molding compound on the transfer film, a molding of the three-dimensional shape of the one or more forming elements is introduced in the transfer ply register-accurately with respect to the decorative ply,
- wherein the method further comprises the following step:
- flooding the transfer ply and/or the injection-molding compound at least in areas with a polyurethane-containing composition and/or with a polyurea-containing composition.

* * * * *